(12) United States Patent
Nakamura

(10) Patent No.: US 10,398,006 B2
(45) Date of Patent: Aug. 27, 2019

(54) OBJECT DETECTION APPARATUS AND MOVEABLE APPARATUS

(71) Applicant: Tadashi Nakamura, Kanagawa (JP)

(72) Inventor: Tadashi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 62 days.

(21) Appl. No.: 15/454,709

(22) Filed: Mar. 9, 2017

(65) Prior Publication Data
US 2017/0273161 A1    Sep. 21, 2017

(30) Foreign Application Priority Data

Mar. 16, 2016   (JP) .................................. 2016-052725
Jan. 24, 2017   (JP) .................................. 2017-010080

(51) Int. Cl.
| | |
|---|---|
| *H05B 37/02* | (2006.01) |
| *B60Q 1/02* | (2006.01) |
| *B60Q 1/26* | (2006.01) |
| *G01S 7/481* | (2006.01) |
| *G01S 17/02* | (2006.01) |
| *G01S 17/93* | (2006.01) |

(Continued)

(52) U.S. Cl.
CPC .......... *H05B 37/0227* (2013.01); *B60Q 1/02* (2013.01); *B60Q 1/2696* (2013.01); *G01S 7/484* (2013.01); *G01S 7/4815* (2013.01); *G01S 7/4817* (2013.01); *G01S 17/023* (2013.01); *G01S 17/42* (2013.01); *G01S 17/936* (2013.01); *G02B 26/105* (2013.01)

(58) Field of Classification Search
CPC .................................. G01S 17/93; G01S 17/06
See application file for complete search history.

(56) References Cited

U.S. PATENT DOCUMENTS

| | | | |
|---|---|---|---|
| 6,580,497 B1* | 6/2003 | Asaka ..................... | G01S 7/481 356/28.5 |
| 8,761,594 B1 | 6/2014 | Gross et al. | |

(Continued)

FOREIGN PATENT DOCUMENTS

| | | |
|---|---|---|
| JP | 2004-028727 | 1/2004 |
| JP | 2005-084034 | 3/2005 |

(Continued)

OTHER PUBLICATIONS

Extended European Search Report dated Aug. 28, 2017 in Patent Application No. 17159434.4.

*Primary Examiner* — Luke D Ratcliffe
(74) *Attorney, Agent, or Firm* — Oblon, McClelland, Maier & Neustadt, L.L.P.

(57) ABSTRACT

An object detection apparatus includes a light emission unit including a light source to emit light, a light receiving unit including a light detector to receive light reflected from an object, a signal processing unit including a signal detector to be input with an output signal of the light detector or a signal acquired by processing the output signal of the light detector, and a control unit to set at least one area in a light emission region of the light emission unit as a target area, and to set at least one of a light emission condition of the light emission unit and a processing condition of the signal processing unit such that the at least one of the light emission condition and the processing condition are different between when the light is emitted to the target area and when the light is emitted to a background area.

19 Claims, 24 Drawing Sheets

(51) Int. Cl.
  *G02B 26/10* (2006.01)
  *G01S 17/42* (2006.01)
  *G01S 7/484* (2006.01)

(56) References Cited

U.S. PATENT DOCUMENTS

| | | |
|---|---|---|
| 2012/0038903 A1 | 2/2012 | Weimer et al. |
| 2014/0009747 A1 | 1/2014 | Suzuki et al. |
| 2014/0034817 A1 | 2/2014 | Nakamura et al. |
| 2014/0036071 A1 | 2/2014 | Nakamura et al. |
| 2014/0209793 A1 | 7/2014 | Nakamura et al. |
| 2015/0124238 A1 | 5/2015 | Sakai et al. |
| 2015/0131080 A1* | 5/2015 | Retterath ............... G01S 17/10 356/5.01 |
| 2015/0160341 A1 | 6/2015 | Akatsu et al. |
| 2015/0268332 A1 | 9/2015 | Nakamura |
| 2015/0268338 A1* | 9/2015 | Freiburger ............ B60W 10/06 701/36 |
| 2015/0331108 A1 | 11/2015 | Itami et al. |
| 2016/0061955 A1 | 3/2016 | Imai et al. |
| 2016/0096474 A1 | 4/2016 | Sakai |
| 2016/0097843 A1 | 4/2016 | Nakamura |
| 2016/0261090 A1 | 9/2016 | Sakai et al. |

FOREIGN PATENT DOCUMENTS

| | | |
|---|---|---|
| JP | 2006-284293 | 10/2006 |
| JP | 2007-096510 | 4/2007 |
| JP | 2007-139594 A | 6/2007 |
| JP | 2009-047658 | 3/2009 |
| JP | 2013-205867 | 10/2013 |
| JP | 2013-538342 | 10/2013 |
| JP | 2015-501927 | 1/2015 |
| JP | 2016-075495 | 5/2016 |
| WO | WO2012/012607 A2 | 1/2012 |
| WO | WO2013/104717 A1 | 7/2013 |

\* cited by examiner

FIG. 7A  FIG. 7B  FIG. 7C
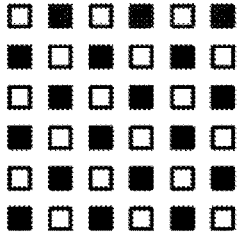
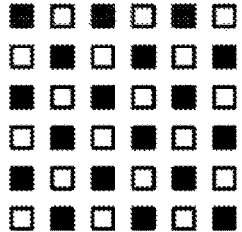
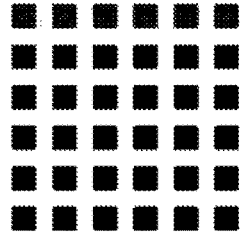
FIG. 8A
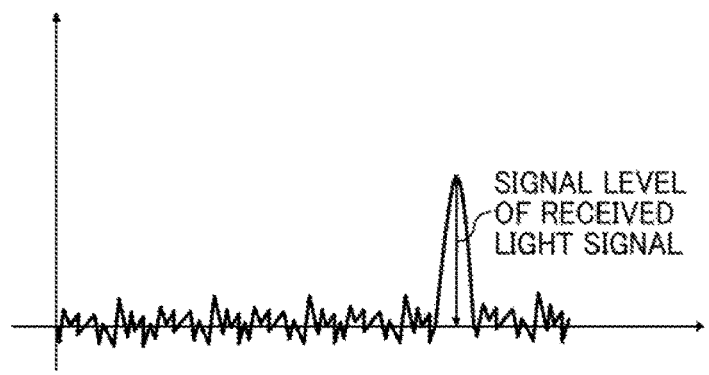
FIG. 8B
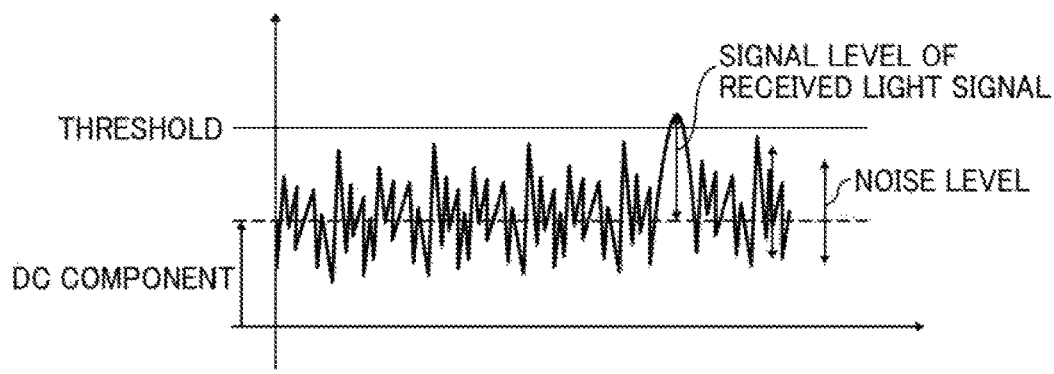

OBJECT DETECTION APPARATUS AND MOVEABLE APPARATUS

CROSS-REFERENCE TO RELATED APPLICATION

This application claims priority pursuant to 35 U.S.C. § 119(a) to Japanese Patent Application Nos. 2016-052725, filed on Mar. 16, 2016, and 2017-010080, filed on Jan. 24, 2017 in the Japan Patent Office, the disclosure of which is incorporated by reference herein in its entirety.

BACKGROUND

Technical Field

This disclosure relates to an object detection apparatus and a moveable apparatus.

Background Art

Apparatuses for detecting an object have been developed. For example, one detection apparatus includes a light source and a light detector for detecting an object, in which light is emitted from the light source, and the light reflected from the object is received by the light detector to acquire object information such as information determining whether the object exists, and distance information to the object.

For example, JP-2006-284293-A discloses a detection apparatus having a light detector, in which a threshold to detect an output signal of the light detector is set lower when detecting information of a specific object such as a low reflective object. However, information of the specific object may not be detected with a sufficient precision.

SUMMARY

As one aspect of present disclosure, an object detection apparatus is devised. The object detection apparatus includes a light emission unit including a light source to emit light to an object, a light receiving unit including a light detector to receive light reflected from the object, a signal processing unit including a signal detector to be input with an output signal of the light detector or a signal that is acquired by processing the output signal of the light detector, and a control unit to set at least one area in a light emission region of the light emission unit as a target area, and to set at least one of a light emission condition of the light emission unit and a processing condition of the signal processing unit such that the at least one of the light emission condition and the processing condition are different between a time when the light is emitted to the target area in the light emission region and a time when the light is emitted to a background area in the light emission region.

As another aspect of present disclosure, another object detection apparatus is devised. The another object detection apparatus includes a light emission unit including a light source to emit light to an object, a light receiving unit including a light detector to receive light reflected from the object, a signal processing unit including a signal detector to be input with an output signal of the light detector or a signal that is acquired by processing the output signal of the light detector, and a control unit to set at least one area in a light emission region of the light emission unit as a target area, and to control at least one of the light emission unit and the signal processing unit such that the signal detector detects the output signal of the light detector or a signal that is acquired by processing the output signal of the light detector when the light is emitted to the target area.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 7A, 7B, and 7C illustrate examples of light ON-OFF patterns set to light emission elements configuring a light source;

FIG. 8A illustrates one relationship of a signal level of a received light signal and a noise level;

FIG. 8B illustrates another relationship of a signal level of a received light signal and a noise level;

Figure 1:
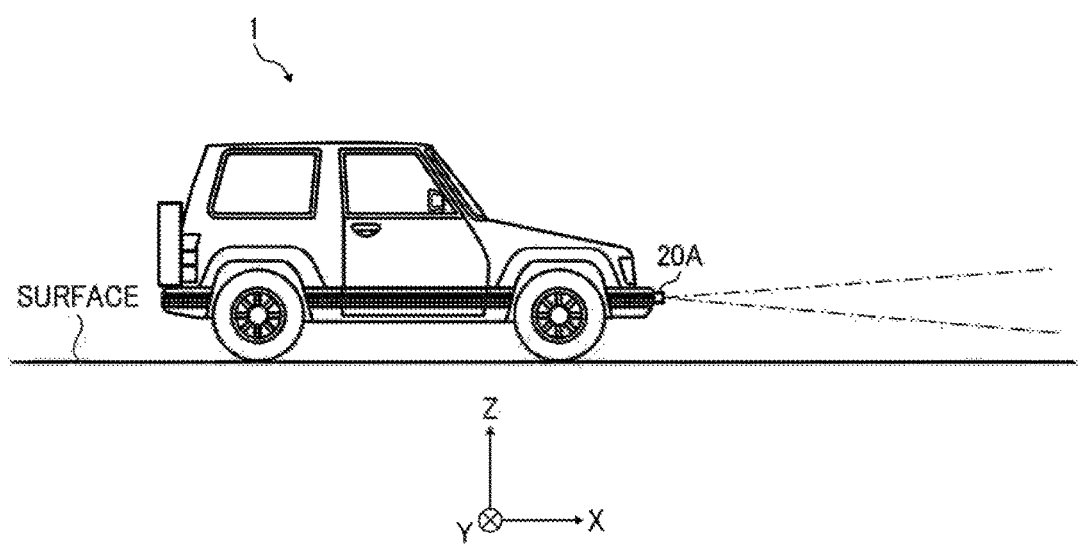
FIG. 1 is a side view of a vehicle mounted with an object detection apparatus of a first embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

(First Embodiment)

A description is given of an object detection apparatus of a first embodiment of the present invention with reference to drawings. The object detection apparatus can employ a laser imaging detection and ranging (LIDAR) 20A also known as a light detection and ranging. The LIDAR 20A, used as a range finder, emits a laser beam and detects a reflection light from an object to find a range to the object. The LIDAR 20A may be also referred to as a laser radar. The LIDAR 20A of the first embodiment employs, for example, a non-scanning type LIDAR.

FIG. 1 is a side view of a vehicle 1 mounted with the LIDAR 20A. The vehicle 1 is an example of moveable apparatuses. For example, the LIDAR 20A is mounted near a number plate at a front of the vehicle 1. Further, the LIDAR 20A can be mounted, for example, near a rear view mirror of the vehicle 1. The LIDAR 20A is supplied with power from, for example, a battery of the vehicle 1.

In this description, the three dimensional rectangular coordinate system "X, Y, Z" is defined by setting a direction perpendicular to a surface as Z-axis direction, and setting the forward direction of the vehicle 1 as +X direction.

Figure 2:
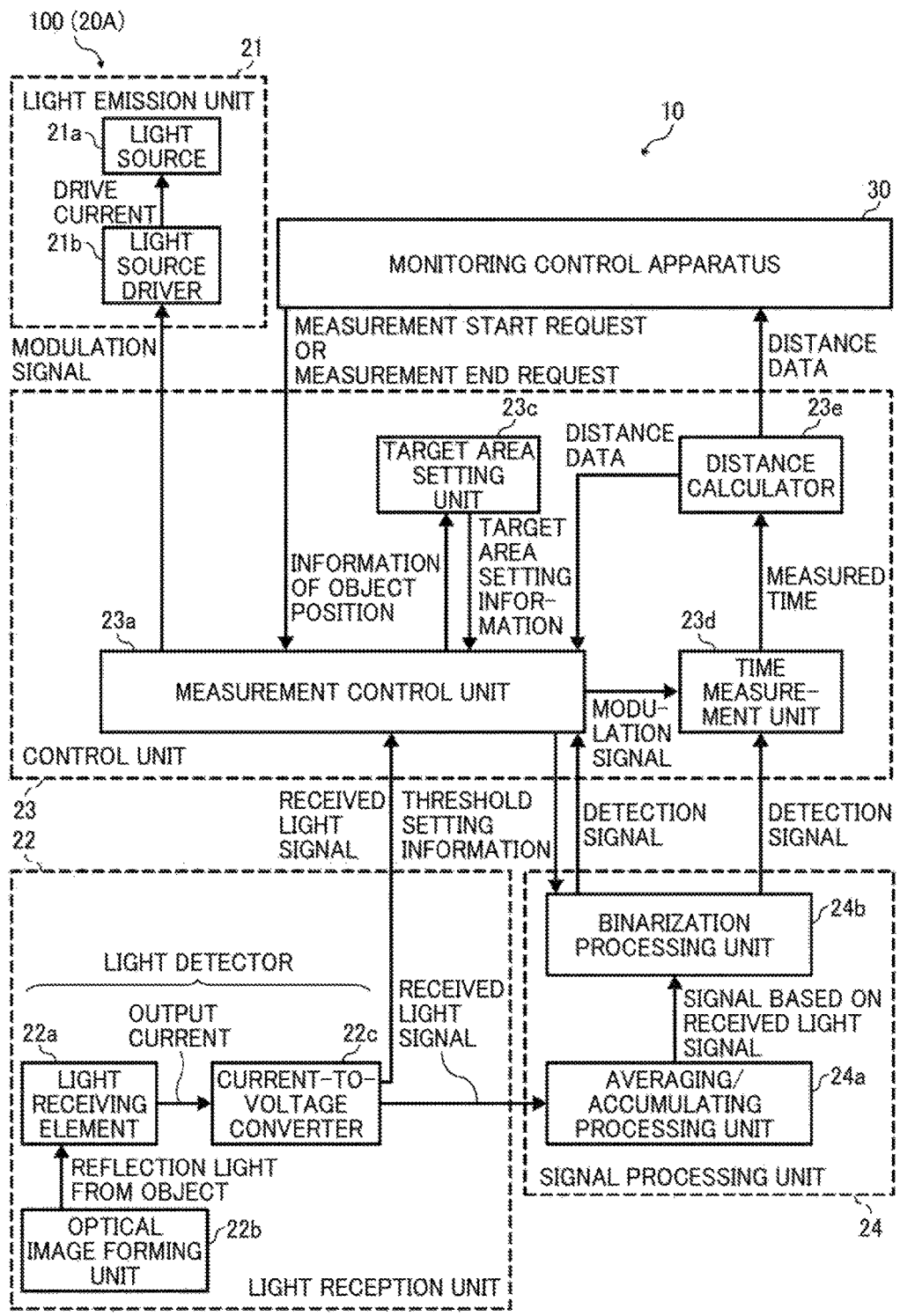
FIG. 2 is a block diagram of a monitoring system of the first embodiment.

FIG. 2 is a block diagram of a monitoring system 10 including, for example, the LIDAR 20A and a monitoring control apparatus 30. Since the monitoring control apparatus 30 is disposed in the vehicle 1, the monitoring system 10 is mounted or disposed in the vehicle 1.

As described in FIG. 2, the LIDAR 20A includes, for example, a light emission unit 21, a light receiving unit 22, a signal processing unit 24, and a control unit 23. The light emission unit 21 includes, for example, a light source 21a such as a laser diode (LD), and a light source driver 21b (LD driver). The light receiving unit 22 includes, for example, a light receiving element 22a, an image forming unit 22b, and a current-to-voltage converter 22c. The signal processing unit 24 includes, for example, an averaging/accumulating processing unit 24a, used as a signal processor, and a binarization processing unit 24b. The control unit 23 controls the light emission unit 21 and the signal processing unit 24.

As to the monitoring system 10, the control unit 23 of the LIDAR 20A is electrically connected to the monitoring control apparatus 30. The monitoring control apparatus 30 control the operation of the LIDAR 20A. Based on information detected by the LIDAR 20A, the monitoring control apparatus 30 performs various processing such as determining a shape and size of an object, calculating position information of an object, calculating movement information of an object, and recognizing a type of an object to determine situations such as dangerous situations. When the monitoring control apparatus 30 determines that a dangerous situation is to occur, the monitoring control apparatus 30 outputs instructions to an alarm unit to output an alarm sound, a steering unit to steer a wheel to avoid the dangerous situation, and/or a braking unit to activate a brake to stop the vehicle 1.

(Principle of Object Detection and Range Finding or Distance Measurement)

Figure 3:
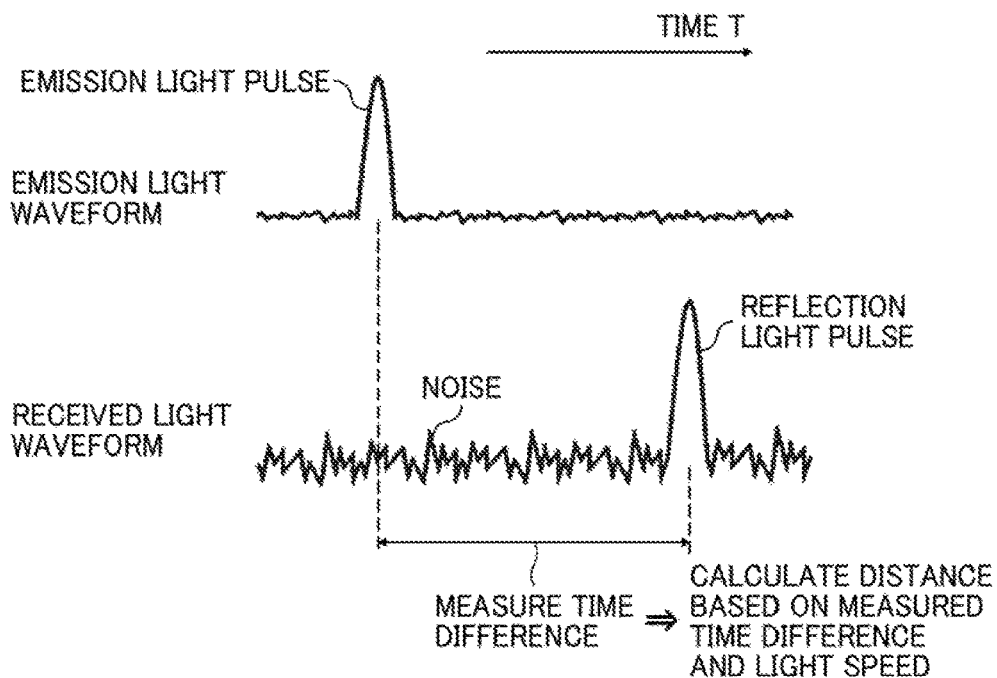
FIG. 3 illustrates an example of an emission light waveform and a received light waveform.

As to the first embodiment, a direct TOF measurement method is employed for an object detection, and a range finding or distance measurement using the LIDAR 20A. A description is given of the direct TOF measurement with reference to FIG. 3, which illustrates an example of an emission light waveform and a received light waveform.

When the light emission unit 21 emits an emission light having an emission light pulse (signal light), the light receiving unit 22 may receive reflection light having a reflection light pulse (signal light). Based on the light received by the light receiving unit 22 (i.e., received light), the control unit 23 can determine whether an object exists in a light emission region.

Further, the control unit 23 measures a time difference between the light emission timing when the light source 21a (e.g., LD) emits a pulse light (i.e., timing when the emission light pulse is emitted as the emission light) and the light reception timing when the light receiving element 22a receives the reflection light reflected from an object (i.e., timing when the light receiving element 22a receives the reflection light pulse as the received light). Then, the control unit 23 multiplies the measured time difference and the light speed to calculate a round trip distance between the LIDAR 20A and the object.

The distance from the light emission unit 21 to the object and the distance from light receiving unit 22 to the object can be assumed as the substantially same distance, and the distance from the light source 21a to the object and the distance from the object to the light receiving element 22a can be assumed as the substantially same distance. Therefore, the control unit 23 calculates the distance from the LIDAR 20A to the object by diving the calculated round trip distance by two.

The time measurement such as the light time difference detection method and the light phase difference detection method can be performed by using various known methods such as the indirect TOF measurement method, but not limited thereto.

In this disclosure, the angular resolution can be acquired by dividing the detection region using any one of the light emission unit 21 and the light receiving unit 22. When the detection region is divided for the light emission unit 21, a plurality of light emission areas is set for the light source 21a, in which each of the light emission areas are separately emitted with light by sequentially turning ON of the plurality of light emission elements. With this configuration, an angle range used for light emission can be secured, and the distance to the object existing in the light emission area can be measured based on the time difference of the light emission timing at each of the light emission areas by the corresponding light emission element and the light reception timing of the corresponding light receiving element.

When the long distance detection is required, a surface emitting laser such as vertical cavity surface emitting laser (VCSEL) is used preferably because a high-power edge-emitting type laser diode (LD) may not have the plurality of light emission areas. As described in FIG. 5, it is preferable to set each of the light emission areas in the detection region (light emission region) by using an optical system having a coupling lens.

When the detection region is divided for the light receiving unit 22, a plurality of light reception areas is set for the light receiving element 22a. In this configuration, even if the entire detection region is emitted with the light, a signal can be detected at each of the light reception areas of the light receiving element 22a separately, with which the detection region can be divided for each angle. In this configuration, as described in FIG. 4, the light emitted from the light source 21a and then reflected from an object is focused onto the plurality of light reception areas of the light receiving element 22a by using the image forming unit 22b, in which it is preferable to set each of the light reception areas as a detection area.

Figure 5:
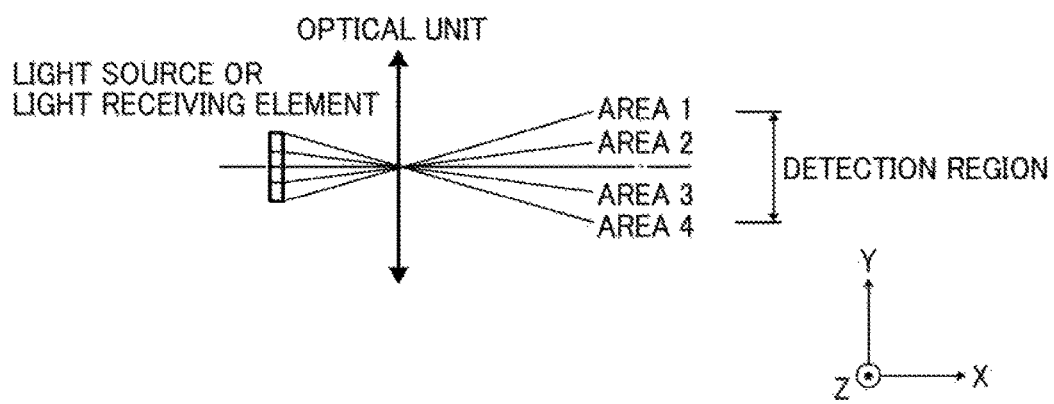
FIG. 5 illustrates a scheme of a light source, a light receiving element, an optical unit, and a detection region.

In FIG. 5, the plurality of light emission areas set for the light source 21a or the plurality of light reception areas set for the light receiving element 22a are arranged along the Y-axis direction alone (i.e., one dimensional arrangement), but the plurality of light emission areas set for the light source 21a or the plurality of light reception areas set for the light receiving element 22a can be arranged along the YZ plane (i.e., two dimensional arrangement) to set the angular resolution for each of the Y-axis direction and Z-axis direction.

When the angular resolution for each of the Y-axis direction and Z-axis direction is set as above described, distance information can be acquired for each of areas in the detection region, and then a distance image can be generated for the detection region, which means the detection region is divided into the plurality of areas set for the light source 21a or the plurality of areas set for the light receiving element 22a to perform the range finding or distance measurement, and the distance image for one frame can be generated by performing one range finding operation for each of the divided areas set in the detection region. For example, if the light emission areas set for the light source 21a or the light reception areas set for the light receiving element 22a are set for each of pixels, each of the divided areas set in the detection region corresponds to each of the pixels of the distance image as one to one relationship. Therefore, each of the divided areas set in the detection region can be also referred to as a pixel area.

Therefore, as to the LIDAR 20A of the first embodiment, a plurality of areas such as the light emission areas set for the light source 21a or the light reception areas set for the light receiving element 22a are arranged along the YZ plane (i.e., two dimensional arrangement).

Figure 6:
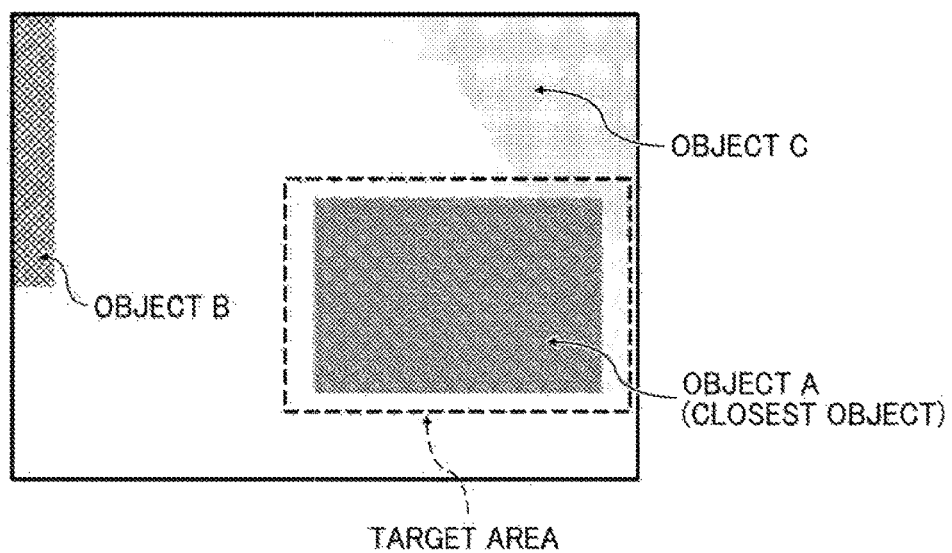
FIG. 6 illustrates an example of a distance image generated by the object detection apparatus.

FIG. 6 illustrates one example of a detection result of object information (i.e., distance image) indicating distance to each of objects for one frame detected by the LIDAR 20A.

In a case of FIG. 6, three objects such as an object A, an object B, and an object C exist in the detection region, in which the object A is present at a position closest from the LIDAR 20A while the object C is present at a position farthest from the LIDAR 20A. Therefore, the object A becomes the closest object for the LIDAR 20A.

The LIDAR 20A can detect an object by using an entire area observation mode and a specific area observation mode, which can be switched as needed. For example, when the distance from the LIDAR 20A to the object is less than a given distance, the specific area observation mode is used, and when the distance from the LIDAR 20A to the object is the given distance or greater, the entire area observation mode is used. When the entire area observation mode is set, the entire light emission region is searched by emitting the light to the entire light emission region evenly.

For example, in a case of FIG. 6, when the distance from the LIDAR 20A to the object A is less than the given distance (e.g., 100 m, 200 m), the observation mode is switched from the entire area observation mode to the specific area observation mode. When the specific area observation mode is set, an area where the object A, which is the closest object in the light emission region (e.g., object that is present at a position closest to the LIDAR 20A), alone exists is detected with the enhanced precision. When the observation mode shifts from the entire area observation mode to the specific area observation mode, the area where the object A exists is set as a target area by the control unit 23.

In a case of FIG. 6, the area where the closest object exists is set as the target area, and other area that is farther from the area where the closest object exists is set as a background area. However, the target area can be set variously. For example, if no detection target objects exists in the entire light emission region (detection region), an area where the moveable apparatus such as the vehicle is to move through can be set as the target area.

If a still object (i.e., an object that does not move but stands still) such as a surface and a building is concurrently detected, the control unit 23 recognizes the still object, and removes the still object from a detection result, and determines which one of the plurality of objects is the closest object based on the detection result.

In this example case of FIG. 6, the target area is determined based on one frame described in FIG. 6, but the number of frames to be referred for the object detection operation can be increased by using previously-captured frames with one frame described in FIG. 6. For example, by recognizing the movement of the moving object existing in the surrounding area of the moveable apparatus along the time line, the movement line of an object in the detection region in the next and subsequent frames can be predicted, and then the moveable apparatus such as the vehicle 1 can be controlled based on the prediction result of the object detection operation, and it can determine whether an object is a still object or a moving object.

When the observation mode shifts to the specific area observation mode, the control unit 23 increases, for example, the light emission intensity of the light emitted from the light emission elements of the light source 21a to the target area to enhance a signal-to-noise (SN) ratio of an output signal of the light receiving unit 22 (i.e., received light signal). The light emission intensity can be increased by increasing an amplitude and a duty of a drive current supplied to the light emission elements of the light source 21a that emit the light to the corresponding light emission areas (first control method). Further, when the light source 21a includes a number of light emission elements, a group of a plurality of light emission elements is used to configure one light emission area. In this configuration, the light emission intensity can be increased by increasing the number of light emission elements to emit the light in the plurality of light emission elements (second control method). Further, the drive current applied to the light emission elements corresponding to the light emission area can be controlled by adjusting a pulse amplitude and a duty (i.e., ratio of pulse width and pulse cycle) of a modulation signal.

A description is given of the second control method with reference to FIG. 7. FIG. 7 illustrates an example configuration having thirty six light emission elements to emit light to one area in the detection region. In FIG. 7, the light emission element is indicated with "ch" and the one area in the detection region can be emitted with light by using the thirty six light emission elements (36 ch). FIGS. 7A and 7B illustrate examples of the light ON-OFF patterns used for the entire area observation mode. Specifically, FIG. 7A illustrates one example of the light ON-OFF pattern that 18 light emission elements (18 ch) is turned ON, and FIG. 7B illustrates another example of the light ON-OFF pattern that 18 light emission elements (18 ch) is turned ON, in which the 18 light emission elements (18 ch) that emit the light in FIG. 7A and the turned-ON 18 light emission elements (18 ch) that emit the light in FIG. 7B are different.

When the entire area observation mode is selected, some light emission elements are turned ON and some light emission elements are turned OFF as described in FIGS. 7A and 7B. Since the portion corresponding to the turned-OFF light emission element "ch" is not directly irradiated by the light, an optical unit may be used with the light source 21a to adjust the light emitted from the light source 21a as diffused light when the entire area observation mode is selected so that the portion corresponding to the turned-OFF light emission element "ch" can be irradiated with the light. Further, in view of the lifetime of the light emission elements "ch," the light ON-OFF pattern of FIG. 7A and the light ON-OFF pattern of FIG. 7B may be switched with a given time interval when the entire area observation mode is used.

When a specific area is determined as the target area during the entire area observation mode, the light ON-OFF pattern is changed to the light ON-OFF pattern described in FIG. 7C, in which all of the 36 light emission elements "ch" are turned ON, with which the light emission intensity to the target area can be increased. Further, an irradiation area can be pre-set for each of the light emission elements "ch," and the each of the light emission elements "ch" can be controlled to increase the light emission intensity to be irradiated to the target area.

When a frame rate is fixed at the same rate, the light emission intensity per one frame (i.e., light intensity emitted per one frame) can be increased by setting shorter light emission cycle (i.e., pulse cycle of emission light pulse) set for the light emission area used for emitting the light to the target area, or by increasing a light emission duty (i.e., ratio of pulse width and pulse cycle of emission light pulse) set for the light emission area used for emitting the light to the target area for one frame. Further, the light emission cycle and the light emission duty set for the light emission area can be controlled by adjusting the pulse cycle and the duty (i.e., ratio of pulse width and pulse cycle) of the modulation signal input to the light source driver 21b that drives the light source 21a.

Further, the light emission intensity per one frame can be increased by reducing the frame rate for the target area alone without changing the light emission cycle.

When the received light signal of the light receiving unit 22 is monitored during the entire area observation mode, and then the observation mode shifts to the specific area observation mode, the light emission to the target area is repeated until a signal level of the received light signal becomes greater than a threshold, with which the object information such as information determining whether the object exists, and distance information to the object can be detected with the enhanced precision.

Further, the signal level of the received light signal can be set in view of a noise level. For example, when the signal level of the received light signal is not significantly greater than the noise level as described in FIG. 8B, the light emission is performed for a plurality of times for each of pixel areas in the target area continuously, and then the light receiving unit 22 receives the light for a plurality of times, and then the plurality of received light signals is output from the light receiving unit 22. Then, the averaging/accumulating processing unit 24a performs the accumulating and/or averaging process of the plurality of the received light signals. As the number of the received light signals increases along the time line, the noise level of random noises becomes closer to zero by performing the accumulating and/or averaging process, with which the signal-to-noise (SN) ratio of the acquired signals (i.e., signals acquired based on the received light signal) can be enhanced. Therefore, the signal level of the received light signal can be set effectively greater than the noise level as described in FIG. 8A.

In a case of FIG. 8B, if the threshold is set lower without reducing the noise level, the noise alone may be detected without detecting an object. Therefore, as described in FIG. 8B, the threshold is preferably set with a given value in view of a to-be-expected maximum noise level. Since the noise level can be reduced by increasing the number of times of accumulating the plurality of the received light signals and then averaging the plurality of the received light signals, the threshold can be set lower by increasing the number of times of accumulating the plurality of the received light signals and then averaging the plurality of the received light signals. Further, the level of the threshold can be set higher or lower by adjusting the number of times of accumulating the plurality of the received light signals. Specifically, the greater the number of times of accumulating the plurality of the received light signals, the threshold is set lower, and the smaller the number of times of accumulating the plurality of the received light signals, the threshold is set higher.

Further, the signal-to-noise (SN) ratio of the detection signal of the light receiving unit 22 can be enhanced by performing the following process. Specifically, the noise level when the light source 21a is turned OFF is pre-stored in memory, then the stored noise level is subtracted from the received light when the light source 21a is turned ON to extract the reflection light pulse (i.e., signal light waveform).

By performing the above described controlling process, the signal light effectively greater than the noise can be acquired from the target area. Therefore, the fluctuation of range finding or distance measurement of the object A existing in the target area caused by the noise can be reduced, and information of distance to the object A can be detected with the enhanced precision. Then, based on the distance information, the deceleration and stop control (braking control) and the evasion control (steering control) of the moveable apparatus can be performed more accurately.

The above description is applied when the object is already detected. If the object is not yet detected, the entire detection region is assumed as the target area, and then the entire detection region is searched by using the entire area observation mode to determine whether the object exists actually.

Typically, an object having lower light reflectance such as black cloth, an object having a greater regular reflection component and a smaller light intensity for the reflected light and diffused light such as mirror and glass, and a small object having a small size for the angular resolution and having greater light intensity loss are difficult to be detected by conventional methods. These objects can be detected when the specific area is set as the target area when conventional methods are used.

By contrast, in the above described configuration, these objects can be detected without setting the specific area as the target area. These objects can be detected by the LIDAR 20A if the object becomes closer to the LIDAR 20A with some distance. However, if the object is detected at the point-blank range or distance from the LIDAR 20A, the counter measure to evade the object is limited to the stop of the moveable apparatus. However, the deceleration of the moving speed is limited to the speed corresponding to allowable stop time, and thereby the collision with the object may occur. Therefore, by detecting the object before the object comes to the point-blank range or distance from the LIDAR 20A, the upper limit of the moving speed of the moveable apparatus can be set higher, with which the evasion operation can be performed without decreasing the moving speed.

Figure 9A:
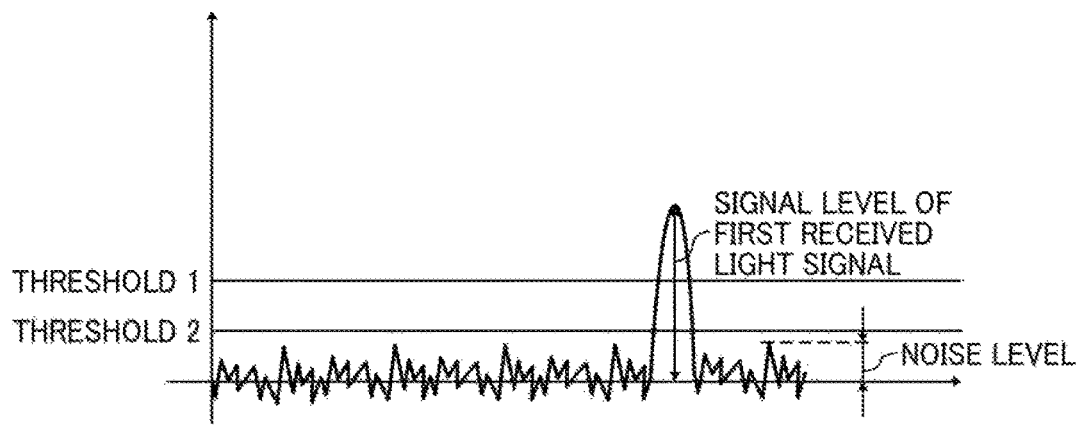
FIG. 9A illustrates a relationship of a first signal level of a received light signal and a noise level.

Further, for example, at least any one of the light source 21a and the averaging/accumulating processing unit 24a can be controlled so that the signal level of a first received light signal, which is the received light signal when the signal light reflected from the object existing in the target area is received by the light receiving unit becomes greater than a first threshold 1 set effectively greater than the noise level as described in FIG. 9A. With this configuration, the signal-to-noise (SN) ratio of the signal level of the first received light signal can be enhanced greatly.

Figure 9B:
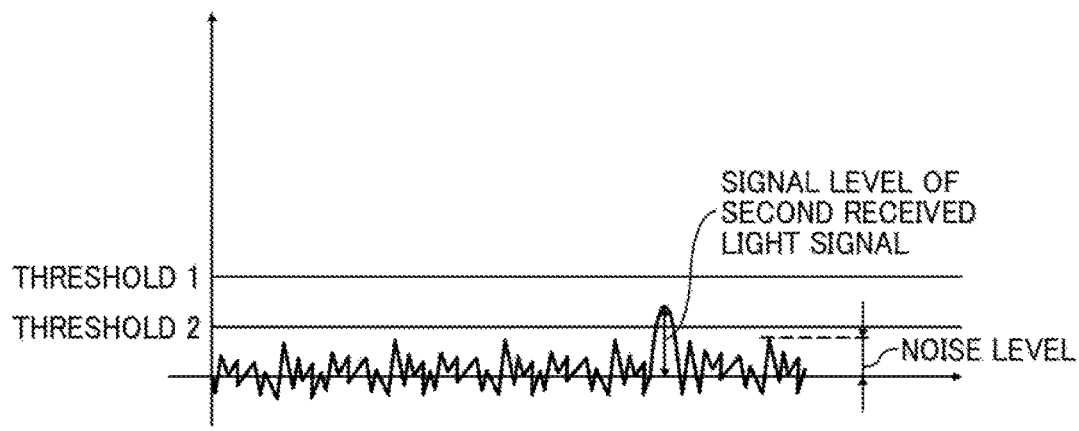
FIG. 9B illustrates a relationship of a second level of a received light signal and a noise level.

Further, for example, at least any one of the light source 21a and the averaging/accumulating processing unit 24a can be controlled so that the signal level of a second received light signal, which is the received light signal when the signal light reflected from the object existing in a background area (target-not-specified area), becomes greater than a second threshold 2 and smaller than the threshold 1 as described in FIG. 9B, in which the second threshold 2 is set greater than the noise level and smaller than the threshold 1.

As a result, the signal level of the first received light signal can be set greater than the signal level of the second received light signal, and further, the SN ratio of the first received light signal can be set greater than the SN ratio of the second received light signal.

Further, the signal level of the first received light signal can be controlled based on the threshold 2 instead of the threshold 1.

(Light Emission Unit)

A description is given of the LIDAR 20A of the first embodiment. As described in FIG. 2, the light emission unit 21 includes, for example, the light source 21a having the light emission elements array composed of the plurality of light emission elements arranged along the YZ plane (i.e., two dimensional arrangement), and the light source driver 21b that drives each of the light emission elements separately. The control unit 23 inputs a modulation signal (i.e., pulse signal) set for each one of the light emission elements to the light source driver 21b.

When the modulation signal set for each one of the light emission elements is input to the light source driver 21b, the light source driver 21b supplies a drive current matched to the modulation signal to the corresponding light emission element. Then, the light emission element emits the emission light pulse to +X direction of the vehicle 1, which is the forward direction of the vehicle 1. The light emitted from the light source 21a is used as the light emitted from the light emission unit 21. The light emitted from each one of the light emission elements progresses in the +X direction of the vehicle 1 while enlarging a lighting region with a given diversion angle. The region that is emitted by the light emitted from the plurality of light emission elements of the light source 21a and parallel to the YZ plane is referred to as a "detection region" or a "light emission region." The plurality of light emission elements is corresponded to the plurality of pixel areas in the detection region as one to one relationship.

In view of human safety of the light source 21a and durability of the light source 21a, the light emission duty (i.e. ratio of light emission time and light emission cycle) of each one of the light emission elements of the light source 21a is set with an upper limit. Therefore, the emission light pulse preferably has a smaller pulse width, in which the pulse width is set with several nano second (ns) to several tens nano seconds (ns). Further, the pulse interval of the emission light pulse is set with, for example, several tens micro seconds.

Further, a size of the detection region can be adjusted by adjusting the light emitted from the light source 21a using an optical element such as a lens. For example, a coupling lens having the concave power can be disposed on the light path of the light emitted from the light source 21a when the detection region is to be enlarged, and a coupling lens having the convex power can be disposed on the light path of the light emitted from the light source 21a when the detection region is to be narrowed.

Further, if the light emission area corresponding to each one of the light emission elements of the light source 21a cannot be ignored, the light emission area corresponding to each one of the light emission elements can be coupled depending on the detection region. For example, the light emission area corresponding to each one of the light emission elements is coupled so that a conjugated image of the light emission areas of the light emission elements appears at infinity. With which, the light emission distribution can be set more evenly. The light emission distribution can be controlled by various optical elements having various shapes such as an optical element having a gabled face.

Further, when enlarging the detection region, an optical element having a diffuser capability such as a micro lens array and frosted glass can be disposed on the light path of the light emitted from the light source 21a.

The light source 21a is not limited to a laser diode (LD). For example, a surface emitting laser such as vertical cavity surface emitting laser (VCSEL), a light emitting diode (LED) or the like can be used as the light source 21a.

(Light Receiving System)

The light receiving unit 22 includes, for example, the light receiving element 22a having a single light reception area, the image forming unit 22b, and the current-to-voltage converter 22c.

Figure 4:
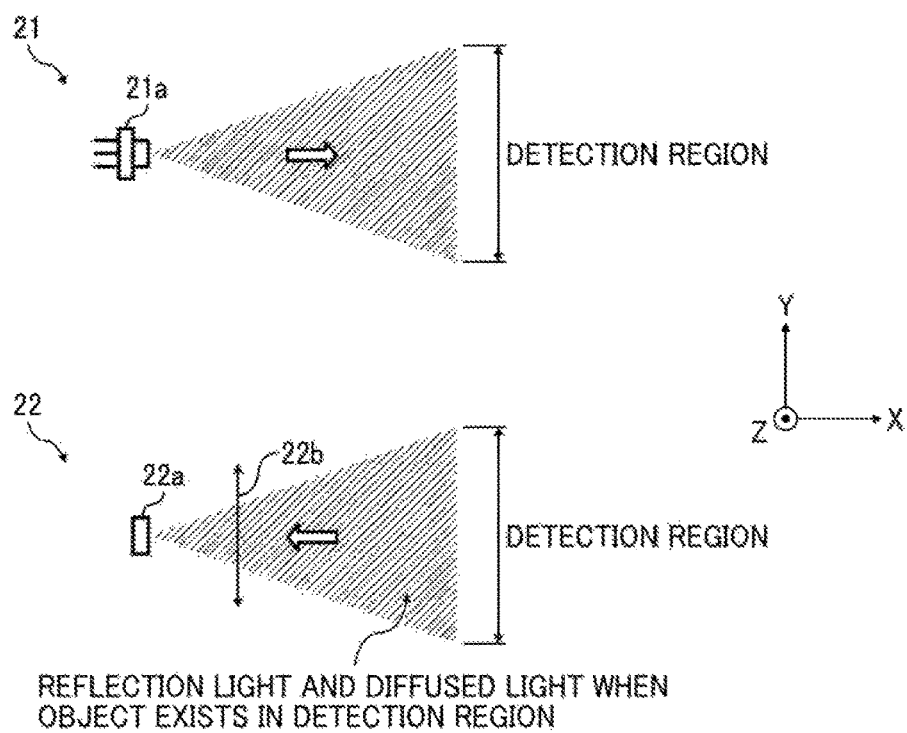
FIG. 4 illustrates a scheme of a light emission unit and a light receiving unit.

In an example case of FIG. 4, the light emission unit 21 and the light receiving unit 22 are disposed in parallel along the Y-axis direction, but the light emission unit 21 and the light receiving unit 22 can be disposed in parallel along the Z-axis direction.

The light receiving element 22a can employ, for example, a photodiode (PD), an avalanche photodiode (APD), a single photon avalanche diode (SPAD) used as geiger mode APD, a complementary metal oxide semiconductor (CMOS) image capture element having time of flight (TOF) capability for each pixel (hereinafter. TOF sensor). The APD and the SPAD have higher sensitivity compared to the PD, which means the APD and the SPAD can be more effective for improving the detection precision and detectable distance. As to the first embodiment, the light receiving element 22a employs the APD.

When an object exists in the detection region, the light emitted from the light source 21a reflects and/or diffuses on the object. Then, the reflection light and the diffused light are received by the light receiving element 22a via the image forming unit 22b that focuses the light on the light receiving element 22a. The image forming unit 22b can be configured with a lens, a mirror, and other that can focus the light onto the light receiving element 22a. An output current output from the light receiving element 22a is converted to a voltage signal by the current-to-voltage converter 22c as the received light signal, and the voltage signal is transmitted to the signal processing unit 24. In this configuration, the light receiving element 22a and the current-to-voltage converter 22c collectively configure a light detector as described in FIG. 2. Further, the light detector can be configured with any configuration that can detect the light. For example, the light detector can be configured to detect heat generated by the light input to the light detector, and the light is detected based on the detected heat.

When the plurality of light emission elements of the light source 21a is turned ON sequentially, and the existence and non-existence of the received light signal is checked for each time the light emission elements of the light source 21a is turned ON, the light emission element corresponding to the received light signal (i.e., the light emission element corresponding to the reflection light from the object) can be identified.

Then, based on the position of the identified light emission element in the array, the pixel area in the detection region where the object exists can be identified, and then the position of the object can be calculated.

(Signal Processing Unit)

The signal processing unit 24 includes, for example, the averaging/accumulating processing unit 24a, and the binarization processing unit 24b as described in FIG. 2.

The averaging/accumulating processing unit 24a performs the averaging/accumulating of a plurality of the received light signals sequentially output from the light receiving unit 22, and outputs the acquired signals to the binarization processing unit 24b.

The binarization processing unit 24b is set with a threshold used for the signal detection operation. When the signal level of the input signal is greater than the threshold, the binarization processing unit 24b binarizes (detects) the input signal, and outputs the binarized signal to the control unit 23 as a detection signal.

Further, the averaging/accumulating processing unit 24a can be omitted from the signal processing unit 24, in which the light receiving unit 22 outputs the received light signal to the binarization processing unit 24b directly.

(Control Unit)

The control unit 23 includes, for example, a measurement control unit 23a, a target area setting unit 23c, a time measurement unit 23d, and a distance calculator 23e as described in FIG. 2.

When the measurement control unit 23a receives a measurement start request from the monitoring control apparatus 30, the measurement control unit 23a generates a modulation signal (pulse signal), and outputs the modulation signal to the light source driver 21b and the time measurement unit 23d. The measurement control unit 23a can adjust at least one of the pulse amplitude, the pulse cycle and the pulse width of the modulation signal, as needed.

Further, the measurement control unit 23a sets a threshold used for binarizing (detecting) the received light signal in a threshold setting process to be describe later, and outputs the setting information (i.e., threshold setting information) to the binarization processing unit 24b.

Further, the measurement control unit 23a determines whether an object exists in the detection region based on the existence and non-existence of the detection signal from the signal processing unit 24. If the measurement control unit 23a determines that the object exists in the detection region ("object exists"), the measurement control unit 23a calculates position information of the object based on the detection signal, and transmits a target area setting request and the position information of the object to the target area setting unit 23c as needed.

When the target area setting unit 23c receives the target area setting request and the position information of the object from the measurement control unit 23a, the target area setting unit 23c sets at least one area where the object exists in the detection region as a target area based on the position information, and outputs the target area setting information to the measurement control unit 23a.

Based on the detection signal (binarized signal) for each of pixel areas received from the binarization processing unit 24b, the time measurement unit 23d calculates the light reception timing at the light receiving element 22a, calculates the time difference between the light reception timing and the rise timing of the modulation signal received from the measurement control unit 23a, and outputs the time difference to the distance calculator 23e as measured time. The light reception timing can be calculated, for example, by using two methods. In one method, when the received light signal crosses a threshold at two time points, the timing between the two time points (e.g., middle timing) can be calculated as the light reception timing. Further, in another method, the timing when the received light signal crosses the threshold from the lower to the upper of the threshold can be calculated as the light reception timing.

The distance calculator 23e converts the measured time for each of pixel areas received from the time measurement unit 23d to distance to calculate a round trip distance to the object, outputs a half of the round trip distance as distance data to the monitoring control apparatus 30, and further to the measurement control unit 23a as needed. The distance data for each one of the pixel areas received from the distance calculator 23e collectively configure the above mentioned distance image.

The monitoring control apparatus 30 performs a steering control of the vehicle 1 (e.g., auto steering), and a speed control (e.g., auto braking) based on the distance data (i.e., distance image) received from the distance calculator 23e.

Figure 10:
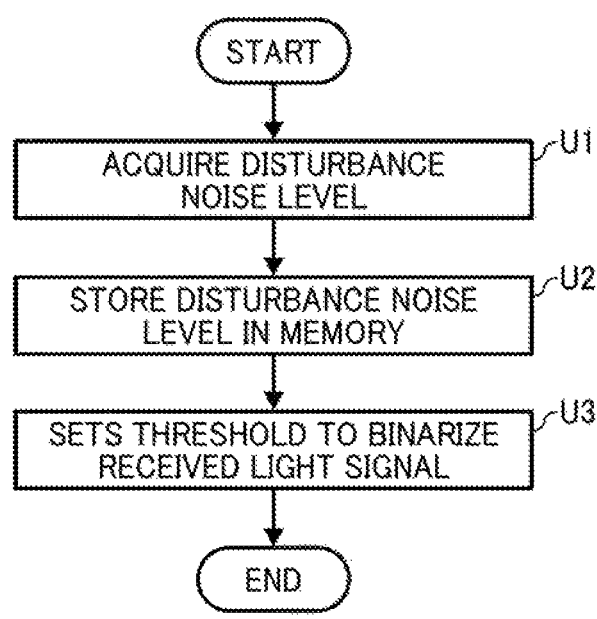
FIG. 10 is a flow chart showing steps of a process of setting a threshold.

A description is given of a process of setting a threshold performable by the measurement control unit 23a with reference to FIG. 10. FIG. 10 is a flow chart showing steps of a process of setting a threshold. The process of setting the threshold can be performed with a given interval such as several minutes interval to several hours interval.

(Threshold Setting Process)

At step U1, a disturbance noise level such as a disturbance noise level is acquired. Specifically, a signal output from the light receiving element 22a when the light source 21a does not emit the light is acquired as a noise level of disturbance noise (e.g., noise caused by disturbance light or ambient light such as sun light, lighting light, circuit noise).

At step U2, the acquired disturbance noise level is stored in a memory.

At step U3, a threshold used for binarizing the received light signal is set. Specifically, a threshold TH greater than the disturbance noise level (e.g., more specifically, the threshold TH greater than the maximum value of the disturbance noise level) is set for the entire light emission region, and the threshold setting information is transmitted to the binarization processing unit 24b.

A description is given of an object detection process 1 used for detecting information of an object by using the LIDAR 20A of the first embodiment.

(Object Detection Process 1)

Figure 11:
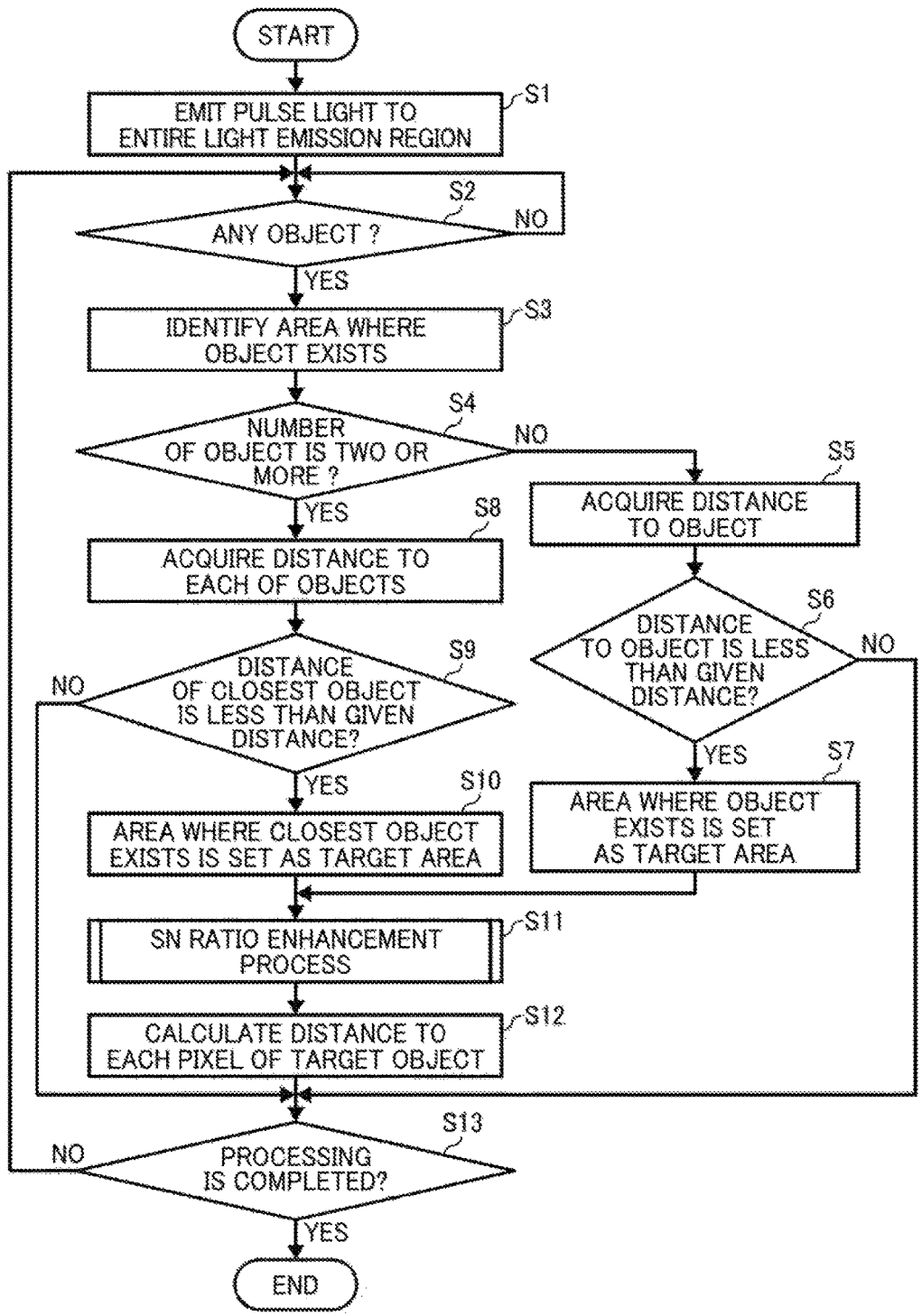
FIG. 11 is a flow chart showing steps of a process of detecting an object (object detection process 1)

A description is given of the object detection process 1 with reference to FIG. 11. FIG. 11 is a flow chart showing steps of a process of detecting an object based on a processing algorithm performable by the measurement control unit 23a. The object detection process 1 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S1, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S2, it is determined whether an object exists in the light emission region (detection region). Specifically, it is checked whether a detection signal is received from the binarization processing unit 24b. If the detection signal is "exist," it is determined that "an object exists," and if the detection signal is "not exist," it is determined that "an object does not exist." If the determination at step S2 is an affirmative result, the sequence proceeds to step S3, and if the determination at step S2 is a negative result, the sequence returns to step S2 to perform the same determination process again.

At step S3, an area where the object exists is identified. Specifically, the plurality of pixel areas corresponding to the plurality of light emission elements used for generating the detection signal at step S2 is identified, which means the position information of the object is identified.

At step S4, it is determined whether the number of the objects is two or more. Specifically, it is determined whether the number of portions, each composed of the plurality of pixel areas identified at step S3, is two or more. If the determination at step S4 is a negative result (i.e., number of portions is one), the sequence proceeds to step S5, and if the determination at step S4 is an affirmative result (i.e., number of portions is two or more), the sequence proceeds to step S8.

At step S5, a distance to the object is acquired. Specifically, distance data calculated by the distance calculator 23e based on the detection signal at step S2 is acquired.

At step S6, it is determined whether the distance to the object is less than a given distance from the LIDAR 20A (e.g., 100 m). If the determination at step S6 is an affirmative result, the sequence proceeds to step S7, and if the determination at step S6 is a negative result, the sequence proceeds to step S13.

At step S7, an area where the object exists is set as a target area. Specifically, after the target area setting request and the position information of the object is transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S7, the sequence proceeds to step S11.

At step S8, the distance to each of the objects is acquired. Specifically, distance data calculated by the distance calculator 23e based on the detection signal at step S2 is acquired.

At step S9, it is determined whether the distance of the closest object (i.e., object that is present at a position closest to the LIDAR 20A) is less than a given distance from the LIDAR 20A (e.g., 100 m). If the determination at step S9 is an affirmative result, the sequence proceeds to step S10, and if the determination at step S is a negative result, the sequence proceeds to step S13.

At step S10, an area where the closest object exists is set as a target area. Specifically, after the target area setting request and the position information of the closest object are transmitted to the target area setting unit 23c, the target area setting unit 23c sets an area encircling the closest object as a target area. The encircling area that encircles the closest object is set slightly greater than the closest object (see FIG. 6). After step S10, the sequence proceeds to step S11.

At step S11, a SN ratio enhancement process is performed. The SN ratio enhancement process will be described later in detail.

At step S12, the distance to each of pixel areas of a target object (i.e., object existing in the target area) is calculated. When the calculated distance of each of pixel areas of the target object are integrated, a distance image of the target object is generated. After step S12, the sequence proceeds to step S13.

At step S13, it is determined whether the processing is ended. When a measurement end request is received from the monitoring control apparatus 30, the determination at step S13 becomes an affirmative result, and when the measurement end request is not received from the monitoring control apparatus 30, the determination at step S13 becomes a negative result. For example, the monitoring control apparatus 30 transmits the measurement end request to the measurement control unit 23a when the electrical system of the vehicle 1 mounted with the LIDAR 20A is turned OFF. If the determination at step S13 is an affirmative result, the sequence is ended, and if the determination at step S13 is a negative result, the sequence returns to step S2.

As to the above described object detection process 1, information of the closest object such as position, size, and shape of the closest object can be detected with an enhanced precision by specifically measuring the closest object existing in the range finding region of the LIDAR 20A by increasing the SN ratio.

A description is given of the SN ratio enhancement process at step S11 as SN ratio enhancement processes 1, 2, and 3.

(SN Ratio Enhancement Process 1)

Figure 12:
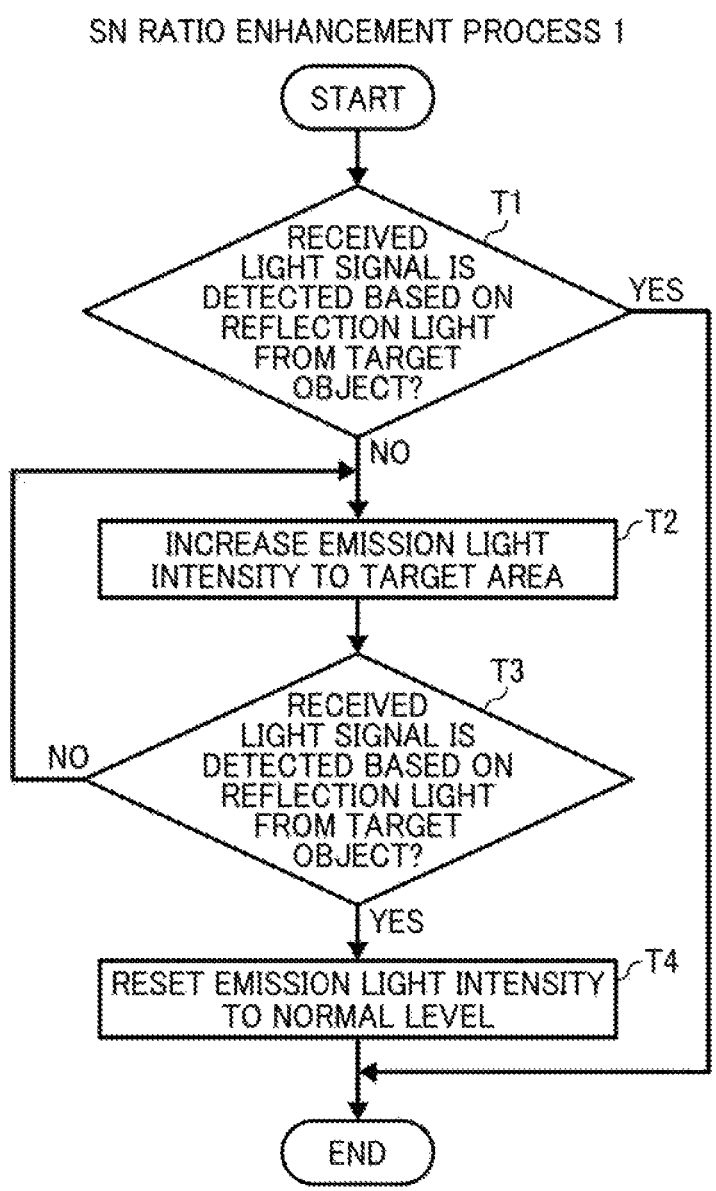
FIG. 12 is a flow chart showing steps of a process of enhancing SN ratio (SN ratio enhancement process 1)

A description is given of a SN ratio enhancement process 1 with reference to FIG. 12. FIG. 12 is a flow chart showing steps of a process of enhancing the SN ratio of the object detection process based on a processing algorithm performable by the measurement control unit 23a. As to the SN ratio enhancement process 1, the signal processing unit 24 does not include the averaging/accumulating processing unit 24a.

At step T1, it is determined whether a received light signal, generated from a reflection light reflected from a target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T1 is an affirmative result, the sequence is ended, and if the determination at step T1 is a negative result, the sequence proceeds to step T2.

At step T2, the light emission intensity of the light emitted to the target area is increased. Specifically, the pulse amplitude of the modulation signal supplied to all of the light emission elements corresponding to the target area is increased, in which the light emission intensity of the light emitted to the target area is set greater than the light emission intensity of the normal level that is the light emission intensity used at step S1 of the object detection process 1. Further, if a part of the light emission elements (i.e., not all of the light emission elements) are emitted at step S1 of the object detection process 1, the number of the light emission elements that emits light can be increased at step T2.

At step T3, it is determined whether a received light signal, generated from a reflection light from the target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T3 is an affirmative result, the sequence proceeds to step T4, and if the determination at step T3 is a negative result, the sequence proceeds to step T2.

By performing steps T2 and T3, the light emission intensity of the light emitted to the target area is increased until the received light signal of the reflection light reflected from the target object is detected. With this configuration, the signal-to-noise (SN) ratio of the received light signal can be enhanced. By contrast, if the determination at step T1 is an affirmative result, the currently-set SN ratio of the received light signal is maintained. Further, if step T2 is performed for a plurality of times, the light emission intensity of the light emitted to the target area is increased as the number of processing times increases.

At step T4, the light emission intensity of the light emitted to the target area is reset to the normal level of the light emission intensity. After step T4, the sequence is ended.

(SN Ratio Enhancement Process 2)

Figure 13:
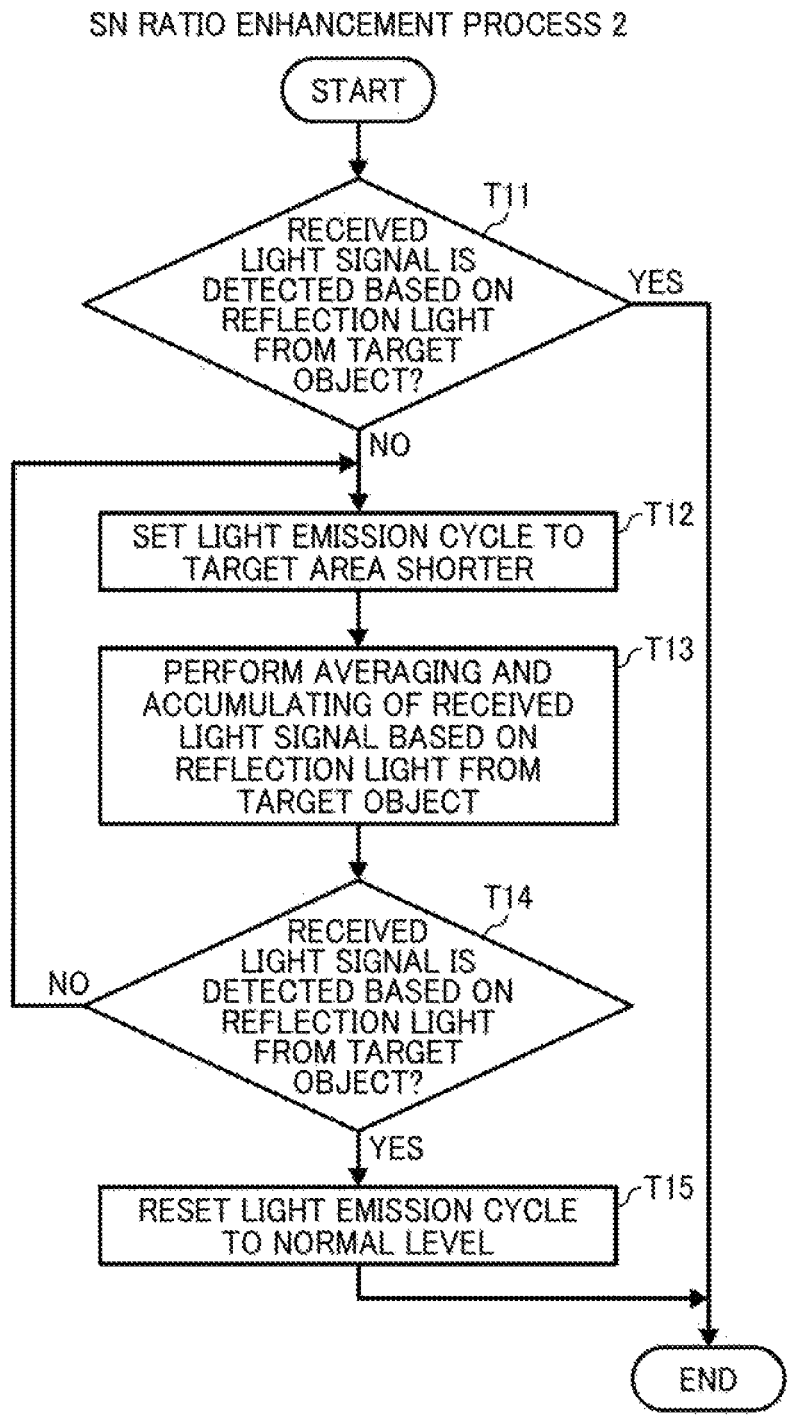
FIG. 13 is a flow chart showing steps of another process of enhancing SN ratio (SN ratio enhancement process 2)

A description is given of a SN ratio enhancement process 2 with reference to FIG. 13. FIG. 13 is a flow chart showing steps of a process of enhancing the SN ratio of the object detection process based on a processing algorithm performable by the measurement control unit 23a. As to the SN ratio enhancement process 2, the signal processing unit 24 includes the averaging/accumulating processing unit 24a.

At step T11, it is determined whether a received light signal, generated from a reflection light reflected from a target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T11 is an affirmative result, the sequence is ended, and if the determination at step T11 is a negative result, the sequence proceeds to step T12.

At step T12, a light emission cycle of the light emitted to the target area is set shorter. Specifically, the pulse cycle of the modulation signal supplied to all of the light emission elements corresponding to the target area is set shorter (i.e., frequency is increased), in which the light emission cycle of the light emitted to the target area is set shorter than the light emission cycle of a normal level that is the light emission cycle used at step SL of the object detection process 1. For example, when the light is emitted to the target area with the normal level of light emission cycle at step S1, the light may be emitted to the target area for one time per one frame at step S1 while when the light emission cycle of the light emitted to the target area is set shorter at step T12, the light can be emitted to the target area for a plurality of times per one frame.

At step T13, the received light signals of the reflection light reflected from the target object are averaged and accumulated. Specifically, when the light is emitted to the target area for a plurality of times per one frame for each frame, the light reflected from the target object is received as a plurality of the received light signals, and then the plurality of the received light signals are averaged and accumulated. With this configuration, the signal-to-noise (SN) ratio of the received light signals can be enhanced. By contrast, if the determination at step T11 is an affirmative result, the currently-set signal-to-noise (SN) ratio of the received light signals is maintained. Further, if a capacitor to accumulate signal charges received from the light receiving element 22a is disposed, the signal charges of the plurality of the received light signals can be accumulated in the capacitor for each frame, and the accumulated signal charges can be output at once.

At step T14, it is determined whether a received light signal, generated from a reflection light reflected from a target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T14 is an affirmative result, the sequence proceeds to step T15, and if the determination at step T14 is a negative result, the sequence proceeds to step T12.

By performing steps T12 to T14, the light emission cycle of the light emitted to the target area is set shorter until the received light signal of the reflection light reflected from the target object is detected, which means the number of the received light signals that are averaged and accumulated for each frame is increased. If step T12 is performed for a plurality of times, the light emission cycle per one frame becomes shorter, the number of light reception times per one frame is increased, and the number of the received light signals that are averaged and accumulated per one frame is increased as the number of processing times increases.

At step T15, the light emission cycle of the light emitted to the target area is reset to the normal level of the light emission cycle. After step T15, the sequence is ended.

(SN Ratio Enhancement Process 3)

Figure 14:
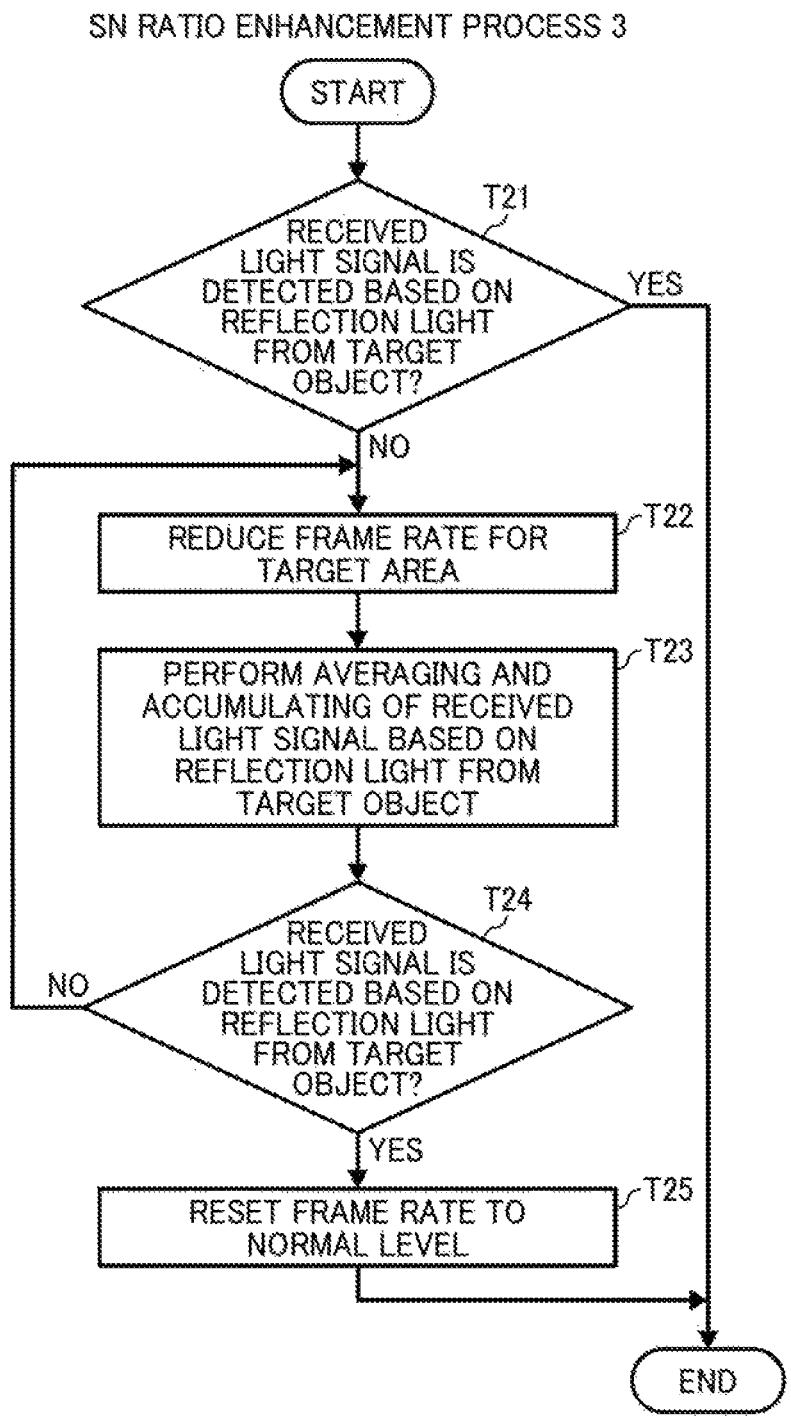
FIG. 14 is a flow chart showing steps of another process of enhancing SN ratio (SN ratio enhancement process 3)

A description is given of a SN ratio enhancement process 3 with reference to FIG. 14. FIG. 14 is a flow chart showing steps of a process of enhancing the SN ratio of the object detection process based on a processing algorithm performable by the measurement control unit 23a. As to the SN ratio enhancement process 3, the signal processing unit 24 includes the averaging/accumulating processing unit 24a.

At step T21, it is determined whether a received light signal, generated from a reflection light reflected from a target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T21 is an affirmative result, the sequence is ended, and if the determination at step T21 is a negative result, the sequence proceeds to step T22.

At step T22, a frame rate set for the target area is reduced. Specifically, the frame rate set for the target area is reduced compared to a normal level of the frame rate set for the target area used at step S1 of the object detection process 1. For example, when the frame rate of normal level is set, the light is received for one time per one frame for the target area at step S1 while when the frame rate set for the target area is reduced, the light is received for a plurality of times per one frame for the target area. Therefore, when the frame rate set for the target area is reduced, the light emission intensity of the light emitted to the target area can be increased.

At step T23, the received light signals of the reflection light reflected from the target object are averaged and accumulated. Specifically, when the light is emitted to the target area for a plurality of times per one frame for each frame, the light reflected from the target object is received as a plurality of the received light signals, and then the plurality of the received light signals are averaged and accumulated. With this configuration, the signal-to-noise (SN) ratio of the received light signals can be enhanced. By contrast, if the determination at step T21 is an affirmative result, the currently-set signal-to-noise (SN) ratio of the received light signals is maintained. Further, if a capacitor to accumulate signal charges received from the light receiving element 22a is disposed, the signal charges of the plurality of the received light signals can be accumulated in the capacitor for each frame, and the accumulated signal charges can be output at once.

At step T24, it is determined whether a received light signal, generated from a reflection light reflected from a target object, is detected. Specifically, it is checked whether a detection signal is received from the binarization processing unit 24b. When the received light signal having a signal level greater than a threshold TH is input to the binarization processing unit 24b, the received light signal is binarized by the binarization processing unit 24b, and the binarized signal is output as the detection signal. If the determination at step T24 is an affirmative result, the sequence proceeds to step T25, and if the determination at step T24 is a negative result, the sequence proceeds to step T22.

By performing steps T22 to T24, the frame rate set for the target area is reduced until the received light signal of the reflection light reflected from the target object is detected. With this configuration, the signal-to-noise (SN) ratio of the received light signals can be enhanced, which means the number of the received light signals that are averaged and accumulated for each frame is increased. If step T22 is performed for a plurality of times, the frame rate is reduced, the number of light reception times per one frame is increased, and the number of the received light signals that are averaged and accumulated per one frame is increased as the number of processing times increases.

At step T25, the frame rate set for the target area is reset to the normal level of the frame rate. After step T25, the sequence is ended.

Further, at least two of the SN ratio enhancement process 1, which increases the light emission intensity, the SN ratio enhancement process 2, which sets the light emission cycle shorter, and the SN ratio enhancement process 3, which reduces the frame rate, can be combined as a SN ratio enhancement process 4.

A description is given of object detection processes 2 to 6 used for detecting information of an object by using the LIDAR 20A of the first embodiment.

(Object Detection Process 2)

Figure 15:
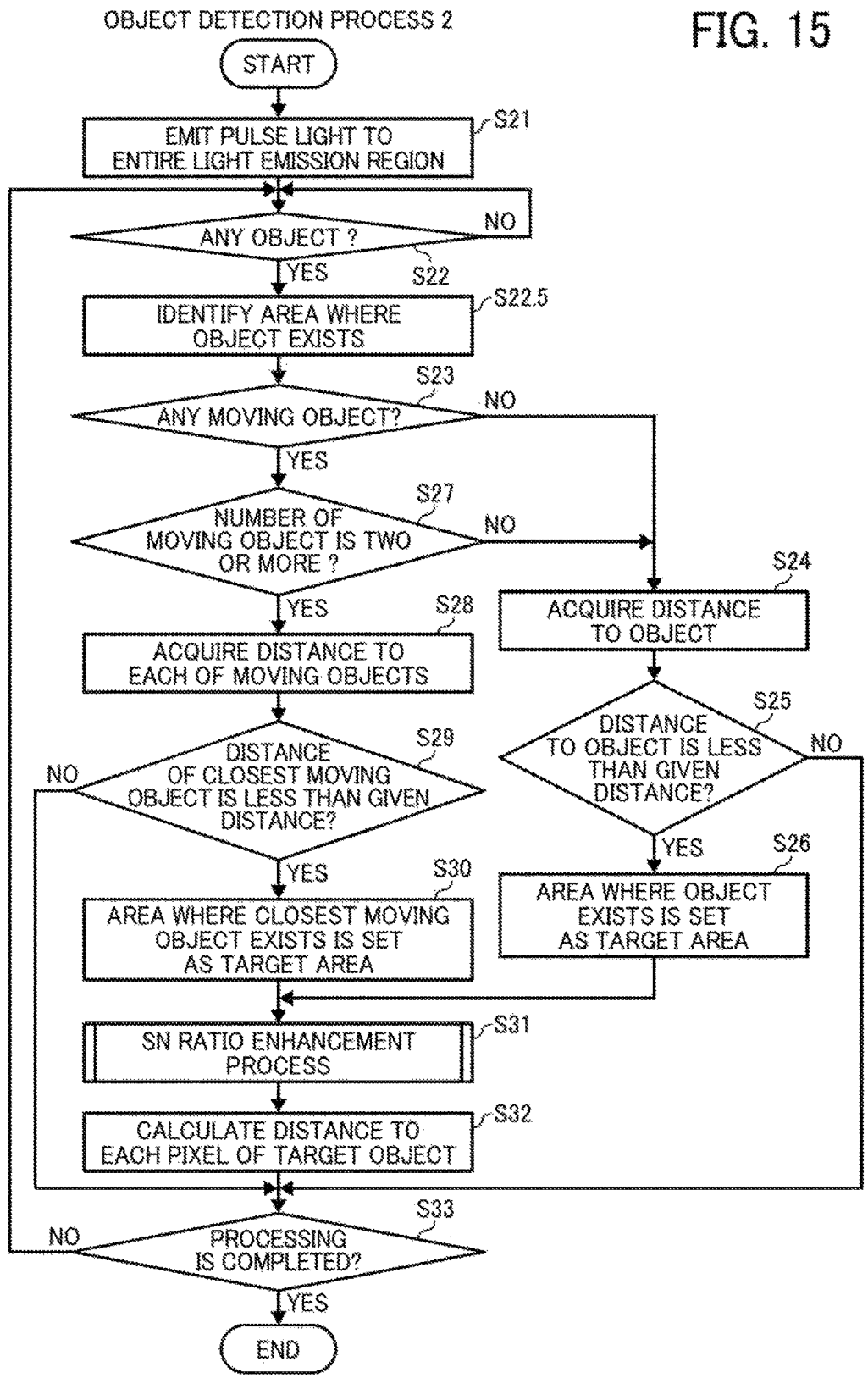
FIG. 15 is a flow chart showing steps of another process of detecting an object (object detection process 2)

A description is given of an object detection process 2 with reference to FIG. 15. FIG. 15 is a flow chart showing steps of another process of detecting an object based on a processing algorithm performable by the measurement control unit 23a. The object detection process 2 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S21, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S22, it is determined whether an object exists in the light emission region (detection region). Specifically, it is checked whether a detection signal is received from the binarization processing unit 24b. If the detection signal is "exist," it is determined that "an object exists", and if the detection signal is "not exist," it is determined that "an object does not exist." If the determination at step S22 is an affirmative result, the sequence proceeds to step S22.5, and if the determination at step S22 is a negative result, the sequence returns to step S22 to perform the same determination process again.

At step S22.5, an area where the object exists is identified. Specifically, the plurality of pixel areas corresponding to the plurality of light emission elements used for generating the detection signal at step S22 is identified, which means the position information of the object is identified.

At step S23, it is determined whether a moving object exists. Specifically, a change of the relative speed of the object and the LIDAR 20A is calculated based on the position of the object in a plurality of sequentially continuing frames of the distance image and a frame rate. If the change of the relative speed is a given value or more, it is determined that the concerned object is a "moving object," and if the change of the relative speed is less than the given value, it is determined that the concerned object is a "still object." If the determination at step S23 is a negative result, the sequence proceeds to step S24, and if the determination at step S23 is an affirmative result, the sequence proceeds to step S27.

At step S24, the distance to the object is acquired. Specifically, distance data calculated by the distance calculator 23e based on the detection signal at step S22 is acquired.

At step S25, it is determined whether the distance to the object is less than a given distance from the LIDAR 20A (e.g., 100 m). If the determination at step S25 is an affirmative result, the sequence proceeds to step S26, and if the determination at step S25 is a negative result, the sequence proceeds to step S33.

At step S26, an area where the object exists is set as a target area. Specifically, after the target area setting request and the position information of the object are transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S26, the sequence proceeds to step S31.

At step S27, it is determined whether the number of the moving objects is two or more. Specifically, it is determined whether the number of the moving objects, determined at step S23, is two or more. If the determination at step S27 is an affirmative result, the sequence proceeds to step S28, and if the determination at step S27 is a negative result, the sequence proceeds to step 24.

At step S28, the distance to each of the moving objects is acquired. Specifically, distance data calculated by the distance calculator 23e based on the detection signal at step S22 is acquired.

At step S29, it is determined whether the distance to the closest moving object (i.e., moving object that is present at a position closest to the LIDAR 20A) is less than a given distance from the LIDAR 20A (e.g., 100 m). If the determination at step S29 is an affirmative result, the sequence proceeds to step S30, and if the determination at step S29 is a negative result, the sequence proceeds to step S33.

At step S30, an area where the closest moving object exists is set as a target area. Specifically, after the target area setting request and the position information of the closest moving object are transmitted to the target area setting unit 23c, the target area setting unit 23c sets an area encircling the closest moving object as the target area. The encircling area that encircles the closest moving object is set slightly greater than the closest moving object (see FIG. 6). After step S30, the sequence proceeds to step S31.

At step S31, the SN ratio enhancement process is performed. For example, any one of the above described SN ratio enhancement processes 1 to 3 is performed.

At step S32, the distance to each of pixel areas corresponding to the target object (i.e., object existing in the target area) is calculated. When the calculated distance of each of pixel areas of the target object are integrated, a distance image of the target object is generated. After step S32, the sequence proceeds to step S33.

At step S33, it is determined whether the processing is ended. When a measurement end request is received from the monitoring control apparatus 30, the determination at step S33 becomes an affirmative result, and when the measurement end request is not received from the monitoring control apparatus 30, the determination at step S33 becomes a negative result. For example, the monitoring control apparatus 30 transmits the measurement end request to the measurement control unit 23a when the electrical system of the vehicle 1 mounted with the LIDAR 20A is turned OFF. If the determination at step S33 is an affirmative result, the sequence is ended, and if the determination at step S33 is a negative result, the sequence returns to step S22.

As to the above described object detection process 2, information of the closest moving object such as position, size, and shape of the closest moving object can be detected with an enhanced precision by specifically measuring the closest moving object existing in the range finding region of the LIDAR 20A by increasing the SN ratio.

(Object Detection Process 3)

Figure 16:
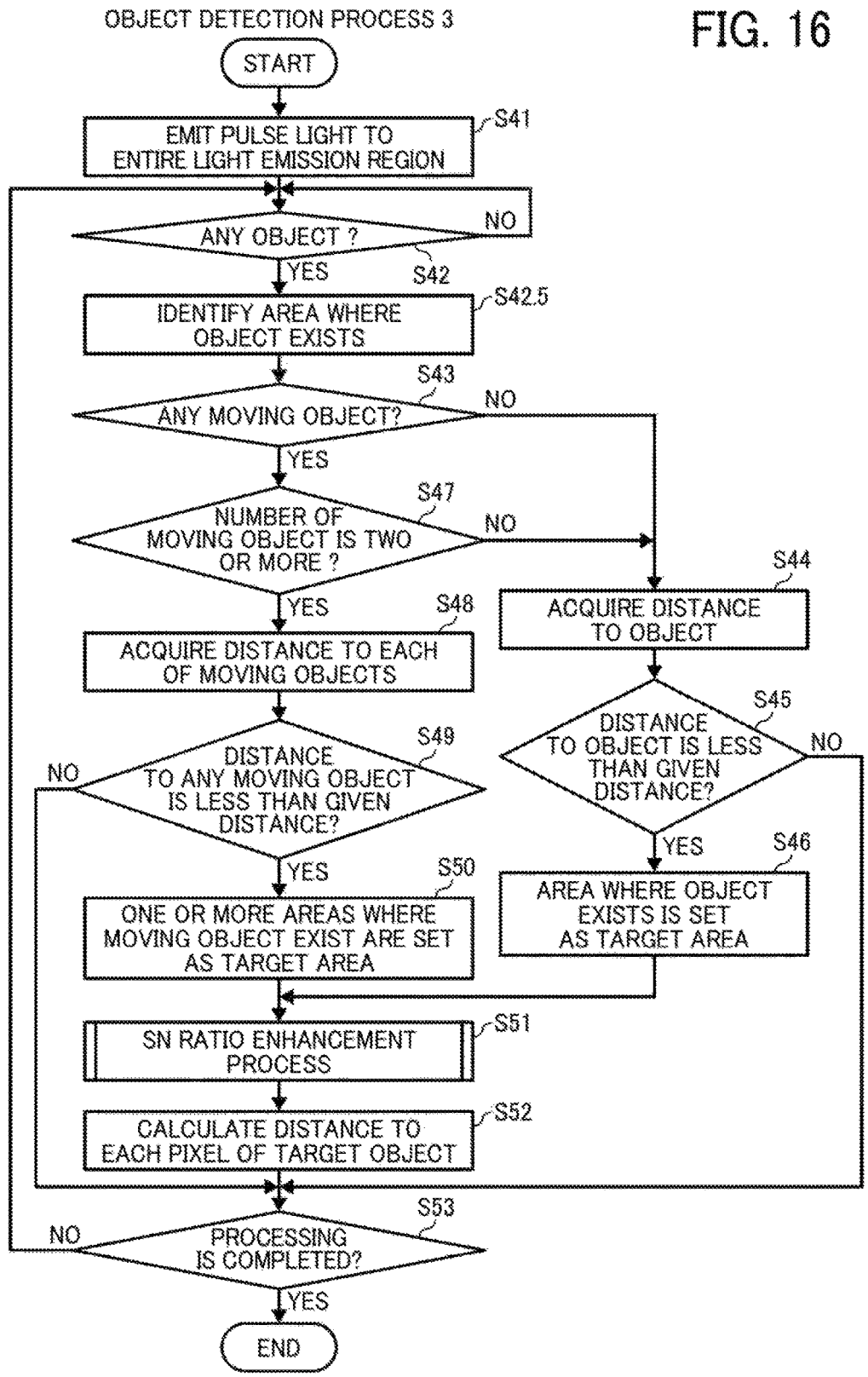
FIG. 16 is a flow chart showing steps of another process of detecting an object (object detection process 3)

A description is given of an object detection process 3 with reference to FIG. 16. FIG. 16 is a flow chart showing steps of another process of detecting an object based on a processing algorithm performable by the measurement control unit 23a. The object detection process 3 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S41, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S42, it is determined whether an object exists in the light emission region (detection region). Specifically, it is checked whether a detection signal is received from the binarization processing unit 24b. If the detection signal is "exist," it is determined that "an object exists," and if the detection signal is "not exist," it is determined that "an object does not exist." If the determination at step S42 is an affirmative result, the sequence proceeds to step S42.5, and if the determination at step S42 is a negative result, the sequence returns to step 42 to perform the same determination process again.

At step S42.5, an area where the object exists is identified. Specifically, the plurality of pixel areas corresponding to the plurality of light emission elements used for generating the detection signal at step S42 is identified, which means the position information of the object is identified.

At step S43, it is determined whether a moving object exists. Specifically, a change of the relative speed of the object and the LIDAR 20A is calculated based on the position of the object in a plurality of sequentially continuing frames of the distance image and a frame rate. If the change of the relative speed is a given value or more, it is determined that the concerned object is a "moving object," and if the change of the relative speed is less than the given value, it is determined that the concerned object is a "still object." If the determination at step S43 is a negative result, the sequence proceeds to step S44, and if the determination at step S43 is an affirmative result, the sequence proceeds to step S47.

At step S44, the distance to the object is acquired. Specifically, distance data calculated by the distance calculator 23e is acquired based on the detection signal at step S42.

At step S45, it is determined whether the distance to the object is less than a given distance from the LIDAR 20A (e.g., 100 m). If the determination at step S45 is an affirmative result, the sequence proceeds to step S46, and if the determination at step S45 is a negative result, the sequence proceeds to step S53.

At step S46, an area where the object exists is set as a target area. Specifically, after the target area setting request and the position information of the object are transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S46, the sequence proceeds to step S51.

At step S47, it is determined whether the number of the moving objects is two or more. Specifically, it is determined whether the number of the moving objects, determined at step S43, is two or more. If the determination at step S47 is an affirmative result, the sequence proceeds to step S48, and if the determination at step S47 is a negative result, the sequence proceeds to step S44.

At step S48, the distance to each of the moving objects is acquired. Specifically, distance data calculated by the distance calculator 23e based on the detection signal at step S42 is acquired.

At step S49, it is determined whether the distance to at least one of the moving objects is less than a given distance from the LIDAR 20A (e.g., 100 m). If the determination at step S49 is an affirmative result, the sequence proceeds to step S50, and if the determination at step S49 is a negative result, the sequence proceeds to step S53. At step S49, it is determined whether one or more moving objects exist within the given distance from the LIDAR 20A.

When the determination at step S49 is the affirmative result, it means that one moving object exists within the given distance from the LIDAR 20A in one area, and further, another moving object may exist within the given distance from the LIDAR 20A in another area. At step S50, when the moving object exists within the given distance from the LIDAR 20A in one or more areas, each of the areas is set as a target area. Specifically, after the target area setting request and the position information of the moving object are transmitted to the target area setting unit 23c, the target area setting unit 23c sets an area encircling the moving object existing at the distance less than the given distance as the target area. The encircling area that encircles the moving object is set slightly greater than the moving object.

At step S51, the SN ratio enhancement process is performed. For example, any one of the above described SN ratio enhancement processes 1 to 3 is performed.

At step S52, the distance to each of pixel areas corresponding to the target object (i.e., object existing in the target area) is calculated. When the calculated distance of each of pixel areas of the target object are integrated, a distance image of the target object is generated. After step S52, the sequence proceeds to step S53.

At step S53, it is determined whether the processing is ended. When a measurement end request is received from the monitoring control apparatus 30, the determination at step S53 becomes an affirmative result, and when the measurement end request is not received from the monitoring control apparatus 30, the determination at step S53 becomes a negative result. For example, the monitoring control apparatus 30 transmits the measurement end request to the measurement control unit 23a when the electrical system of the vehicle 1 mounted with the LIDAR 20A is turned OFF. If the determination at step S53 is an affirmative result, the sequence is ended, and if the determination at step S53 is a negative result, the sequence returns to step S42.

As to the above described object detection process 3, information of one or more moving objects such as position, size, and shape of the one or more moving objects can be detected with an enhanced precision by specifically measuring all of the moving objects existing in of the LIDAR 20A by increasing the SN ratio.

(Object Detection Process 4)

Figure 17:
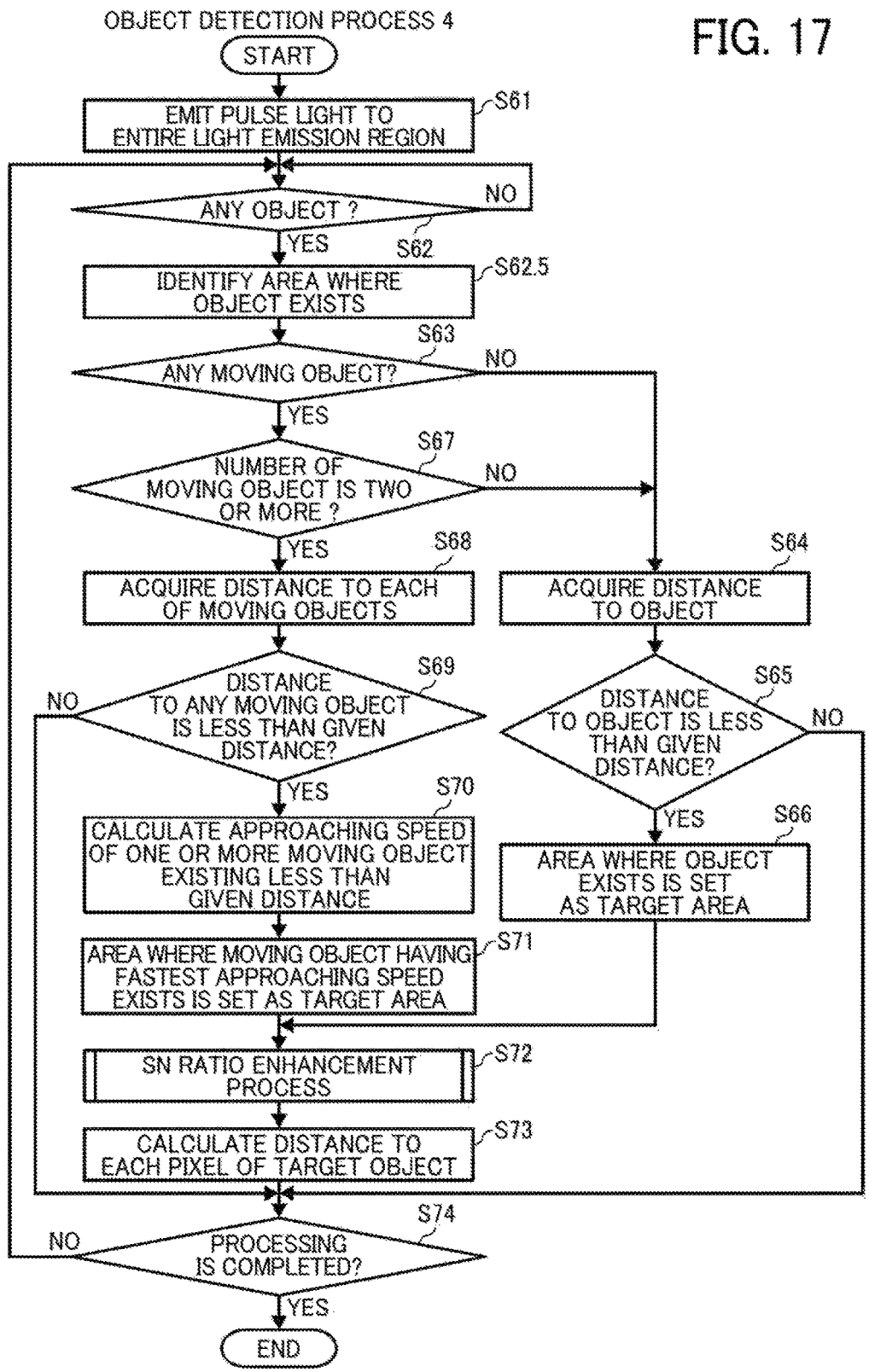
FIG. 17 is a flow chart showing steps of another process of detecting an object (object detection process 4)

A description is given of the object detection process 4 with reference to FIG. 17. FIG. 17 is a flow chart showing steps of another process of detecting an object based on a processing algorithm performable by the measurement control unit 23a. The object detection process 4 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S61, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S62, it is determined whether an object exists in the light emission region (detection region). Specifically, it is checked whether a detection signal is received from the binarization processing unit 24b. If the detection signal is "exist," it is determined that "an object exists," and if the detection signal is "not exist," it is determined that "an object does not exist." If the determination at step S62 is an affirmative result, the sequence proceeds to step S62.5, and if the determination at step S62 is a negative result, the sequence returns to step 62 to perform the same determination process again.

At step S62.5, an area where the object exists is identified. Specifically, the plurality of pixel areas corresponding to the plurality of light emission elements used for generating the detection signal at step S62 is identified, which means the position information of the object is identified.

At step S63, it is determined whether a moving object exists. Specifically, a change of the relative speed of the object and the LIDAR 20A is calculated based on the position of the object in a plurality of sequentially continuing frames of the distance image and a frame rate. If the change of the relative speed is a given value or more, it is determined that the concerned object is a "moving object." and if the change of the relative speed is less than the given value, it is determined that the concerned object is a "still object." If the determination at step S63 is a negative result, the sequence proceeds to step S64, and if the determination at step S63 is an affirmative result, the sequence proceeds to step S67.

At step S64, the distance to the object is acquired. Specifically, distance data calculated by the distance calculator 23e based on the detection signal at step S62 is acquired.

At step S65, it is determined whether the distance to the object is less than a given distance from the LIDAR 20A (e.g., 100 m). If the determination at step S65 is an affirmative result, the sequence proceeds to step S66, and if the determination at step S65 is a negative result, the sequence proceeds to step S74.

At step S66, an area where the object exists is set as a target area. Specifically, after the target area setting request and the position information of the object are transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S66, the sequence proceeds to step S72.

At step S67, it is determined whether the number of the moving objects is two or more. Specifically, it is determined whether the number of the moving objects, determined at step S63, is two or more. If the determination at step S67 is an affirmative result, the sequence proceeds to step S68, and if the determination at step S47 is a negative result, the sequence proceeds to step S64.

At step S68, the distance to each of the moving objects is acquired. Specifically, distance data calculated by the distance calculator 23e based on the detection signal at step S62 is acquired.

At step S69, it is determined whether the distance to at least one of the moving objects is less than a given distance from the LIDAR 20A (e.g., 100 m). If the determination at step S69 is an affirmative result, the sequence proceeds to step S70, and if the determination at step S69 is a negative result, the sequence proceeds to step S74. At step S69, it is determined whether one or more moving objects exist within the given distance from the LIDAR 20A.

At step S70, the approaching speed of one or more moving objects, existing less than the given distance from the LIDAR 20A, is calculated. Specifically the approaching speed of the moving object is calculated based on the position of the moving object in a plurality of sequentially continuing frames of the distance image and a frame rate. Further, the approaching speed is indicated with a plus (+) or minus (−) sign, in which the plus (+) sign indicates that the moving object is coming closer to the LIDAR 20A, and the minus (−) sign indicates that the moving object is leaving from the LIDAR 20A.

At step 71 an area where the moving object having the fastest-approaching-speed exists is set as a target area. Specifically, after the target area setting request and the position information of the moving object having the fastest approaching speed are transmitted to the target area setting unit 23c, the target area setting unit 23c sets an area encircling the moving object having the fastest approaching speed as the target area. The encircling area that encircles the moving object having the fastest-approaching-speed is set slightly greater than the moving object having the fastest-approaching-speed.

At step S72, the SN ratio enhancement process is performed. For example, any one of the above described SN ratio enhancement processes 1 to 3 is performed.

At step S73, the distance to each of pixel areas corresponding to the target object (i.e., object existing in the target area) is calculated. When the calculated distance of each of pixel areas of the target object are integrated, a distance image of the target object is generated.

At step S74, it is determined whether the processing is ended. When a measurement end request is received from the monitoring control apparatus 30, the determination at step S74 becomes an affirmative result, and when the measurement end request is not received from the monitoring control apparatus 30, the determination at step S74 becomes a negative result. For example, the monitoring control apparatus 30 transmits the measurement end request to the measurement control unit 23a when the electrical system of the vehicle 1 mounted with the LIDAR 20A is turned OFF. If the determination at step S74 is an affirmative result, the sequence is ended, and if the determination at step S74 is a negative result, the sequence returns to step S62.

As to the above described object detection process 4, information of the moving object having the fastest-approaching-speed such as position, size, and shape of the moving object having the fastest-approaching-speed can be detected with an enhanced precision by specifically measuring the moving object having the fastest-approaching-speed existing in the range finding region of the LIDAR 20A by increasing the SN ratio.

(Object Detection Process 5)

Figure 18:
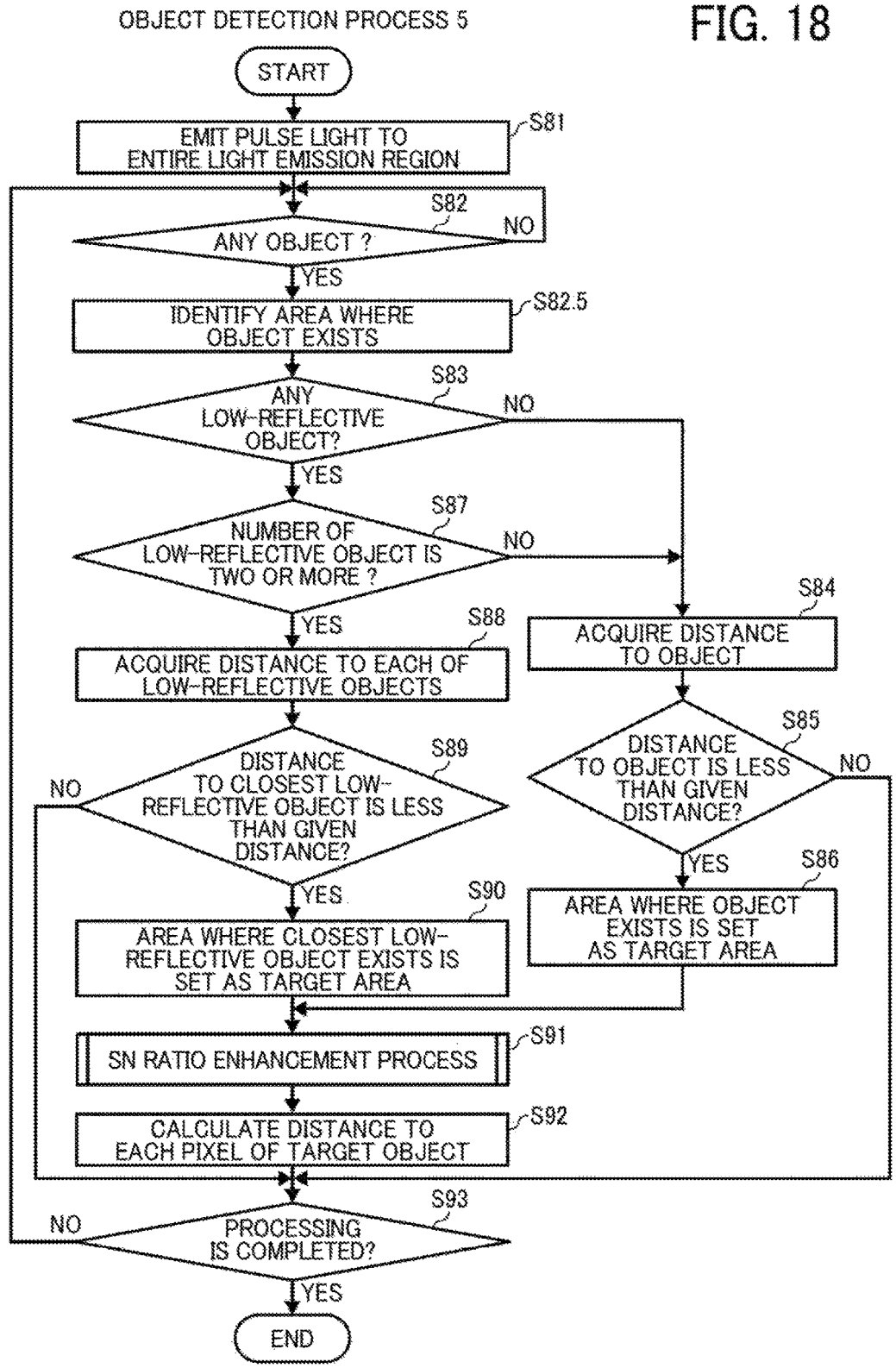
FIG. 18 is a flow chart showing steps of another process of detecting an object (object detection process 5)

A description is given of the object detection process 5 with reference to FIG. 18. FIG. 18 is a flow chart showing steps of another process of detecting an object based on a processing algorithm performable by the measurement control unit 23a. The object detection process 5 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S81, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S82, it is determined whether an object exists in the light emission region (detection region). Specifically, it is checked whether a detection signal is received from the binarization processing unit 24b. If the detection signal is "exist," it is determined that "an object exists," and if the detection signal is "not exist," it is determined that "an object does not exist." If the determination at step S82 is an affirmative result, the sequence proceeds to step S82.5, and if the determination at step S82 is a negative result, the sequence returns to step 82 to perform the same determination process again.

At step S82.5, an area where the object exists is identified. Specifically, the plurality of pixel areas corresponding to the plurality of light emission elements used for generating the detection signal at step S82 is identified, which means the position information of the object is identified.

At step S83, it is determined whether a low-reflective object exists. At step S83, a signal level (i.e., received light intensity) of a received light signal, used as a source signal for the detection signal detected at step S82, is acquired, and a ratio of the signal level and the distance from the LIDAR 20A to the object, calculated from the position information of the object calculated at step S82.5, is determined. If the ratio is less than a given value, the object is assumed as the low-reflective object. If the determination at step S83 is a negative result, the sequence proceeds to step S84, and if the determination at step S83 is an affirmative result, the sequence proceeds to step S87.

At step S84, the distance to the object is acquired. Specifically, distance data calculated by the distance calculator 23e based on the detection signal at step S82 is acquired.

At step S85, it is determined whether the distance to the object is less than a given distance from the LIDAR 20A (e.g., 100 m). If the determination at step S85 is an affirmative result, the sequence proceeds to step S86, and if the determination at step S85 is a negative result, the sequence proceeds to step S93.

At step S86, an area where the object exists is set as a target area. Specifically, after the target area setting request and the position information of the object are transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S86, the sequence proceeds to step S91.

At step S87, it is determined whether the number of the low-reflective objects is two or more. Specifically, it is determined whether the number of the objects having the ratio less than the given value, calculated at step S83, is two or more. If the determination at step S87 is an affirmative result, the sequence proceeds to step S88, and if the determination at step S87 is a negative result, the sequence proceeds to step S84.

At step S88, the distance to each of the low-reflective objects is acquired. Specifically, distance data calculated by the distance calculator 23e based on the detection signal at step S82 is acquired.

At step S89, it is determined whether the distance to the closest low-reflective object (i.e., low-reflective object that is present at a position closest to the LIDAR 20A) is less than a given distance from the LIDAR 20A (e.g., 200 m). If the determination at step S89 is an affirmative result, the sequence proceeds to step S90, and if the determination at step S89 is a negative result, the sequence proceeds to step S93.

At step S90, an area where the closest low-reflective object exists is set as a target area. Specifically, after the target area setting request and the position information of the closest low-reflective object are transmitted to the target area setting unit 23c, the target area setting unit 23c sets an area encircling the closest low-reflective object as the target area. The encircling area that encircles the closest low-reflective object is set slightly greater than the closest low-reflective object.

At step S91, the SN ratio enhancement process is performed. For example, any one of the above described SN ratio enhancement processes 1 to 3 is performed.

At step S92, the distance to each of pixel areas corresponding to the target object (i.e., object existing in the target area) is calculated. When the calculated distance of each of pixel areas of the target object are integrated, a distance image of the target object is generated.

At step S93, it is determined whether the processing is ended. When a measurement end request is received from the monitoring control apparatus 30, the determination at step S93 becomes an affirmative result, and when the measurement end request is not received from the monitoring control apparatus 30, the determination at step S93 becomes a negative result. For example, the monitoring control apparatus 30 transmits the measurement end request to the measurement control unit 23a when the electrical system of the vehicle 1 mounted with the LIDAR 20A is turned OFF. If the determination at step S93 is an affirmative result, the sequence is ended, and if the determination at step S93 is a negative result, the sequence returns to step S82.

As to the above described object detection process 5, information of the closest low-reflective object such as position, size, and shape of the closest low-reflective object can be detected with an enhanced precision by specifically measuring the closest low-reflective object existing in the range finding region of the LIDAR 20A by increasing the SN ratio.

(Object Detection Process 6)

Figure 19:
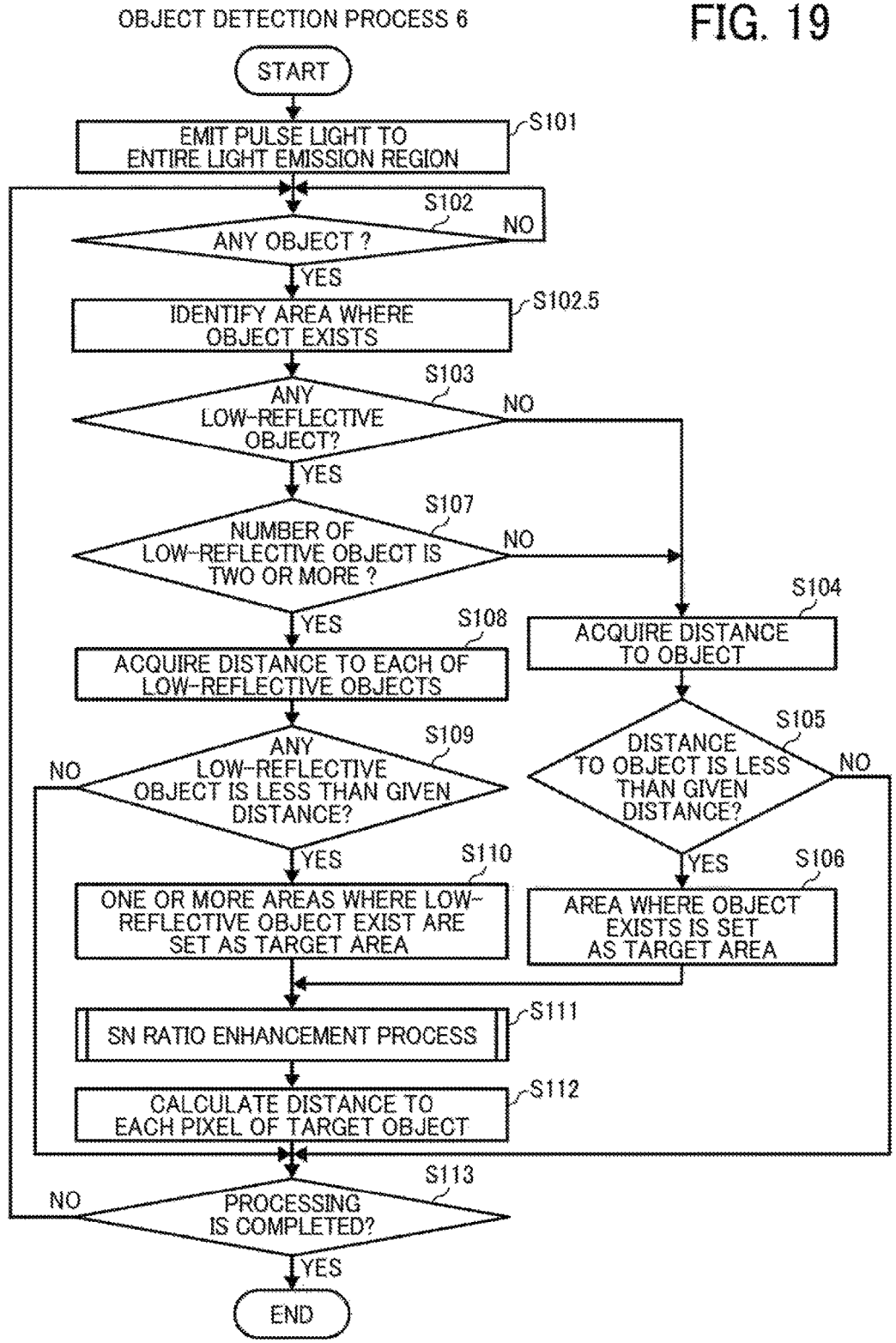
FIG. 19 is a flow chart showing steps of another process of detecting an object (object detection process 6)

A description is given of the object detection process 6 with reference to FIG. 19. FIG. 19 is a flow chart showing steps of another process of detecting an object based on a processing algorithm performable by the measurement control unit 23a. The object detection process 6 is started when the measurement start request is received from the monitoring control apparatus 30. For example, the monitoring control apparatus 30 transmits the measurement start request to the LIDAR 20A when the electrical system of the vehicle 1 mounted with the LIDAR 20A is turned ON.

At step S101, the pulse light is emitted to the entire light emission region. Specifically, the plurality of light emission elements of the light source 21a of the light emission unit 21 is sequentially emit the pulse light, which means the modulation signal having the same pulse amplitude, the same pulse width, and the same pulse cycle is applied to the plurality of light emission elements at different timing by the light source driver 21b so that each one of the light emission elements of the light source 21a emits the pulse light with the same light emission intensity at different emission timing.

At step S102, it is determined whether an object exists in the light emission region (detection region). Specifically, it is checked whether a detection signal is received from the binarization processing unit 24b. If the detection signal is "exist," it is determined that "an object exists," and if the detection signal is "not exist," it is determined that "an object does not exist." If the determination at step S102 is an affirmative result, the sequence proceeds to step S102.5, and if the determination at step S102 is a negative result, the sequence returns to step 102 to perform the same determination process again.

At step S102.5, an area where the object exists is identified. Specifically, the plurality of pixel areas corresponding to the plurality of light emission elements used for generating the detection signal at step S102 is identified, which means the position information of the object is identified.

At step S103, it is determined whether a low-reflective object exists. At step S103, a signal level (i.e., received light intensity) of a received light signal, used as a source signal for the detection signal detected at step 102, is acquired, and a ratio of the signal level and the distance from the LIDAR 20A to the object calculated from the position information of the object calculated at step S102.5 is determined. If the ratio is less than a given value, the object is assumed as the low-reflective object. If the determination at step S103 is a negative result, the sequence proceeds to step S104, and if the determination at step S103 is an affirmative result, the sequence proceeds to step S107.

At step S104, the distance to the object is acquired. Specifically, distance data calculated by the distance calculator 23e based on the detection signal at step S102 is acquired.

At step S105, it is determined whether the distance to the object is less than a given distance from the LIDAR 20A (e.g., 100 m). If the determination at step S105 is an affirmative result, the sequence proceeds to step S106, and if the determination at step S105 is a negative result, the sequence proceeds to step S113.

At step S106, an area where the object exists is set as a target area. Specifically, after the target area setting request and the position information of the object are transmitted to the target area setting unit 23c, the target area setting unit 23c sets an area encircling the object as the target area. The encircling area that encircles the object is set slightly greater than the object. The target area setting unit 23c outputs the target area setting information to the measurement control unit 23a. After step S106, the sequence proceeds to step S111.

At step S107, it is determined whether the number of the low-reflective objects is two or more. Specifically, it is determined whether the number of the objects, having the ratio calculated at step S103 that is less than the given value, is two or more. If the determination at step S107 is an affirmative result, the sequence proceeds to step S108, and if the determination at step S107 is a negative result, the sequence proceeds to step S104.

At step S108, the distance to each of the low-reflective objects is acquired. Specifically, distance data calculated by the distance calculator 23e based on the detection signal at step S102 is acquired.

At step S109, it is determined whether the distance to at least one of the low-reflective objects is less than the given distance (e.g., 100 m). If the determination at step S109 is an affirmative result, the sequence proceeds to step S110, and if the determination at step S109 is a negative result, the sequence proceeds to step S113.

When the determination at step S109 is the affirmative result, it means that one low-reflective object exists within the given distance from the LIDAR 20A in one area, and further, another low-reflective object may exist within the given distance from the LIDAR 20A in another area. At step S110, when the low-reflective object exists within the given distance from the LIDAR 20A in one or more areas, each of the areas is set as a target area. Specifically, after the target area setting request and the position information of the low-reflective object are transmitted to the target area setting unit 23c, the target area setting unit 23c sets an area encircling a low-reflective object existing at the distance less than the given distance as the target area. The encircling area that encircles the low-reflective object is set slightly greater than the low-reflective object. The target area setting unit 23c outputs the target area setting information to the measurement control unit 23a.

At step S111, the SN ratio enhancement process is performed. For example, any one of the above described the SN ratio enhancement processes 1 to 3 is performed.

At step S112, the distance to each of pixel areas corresponding to the target object (i.e., object existing in the target area) is calculated. When the calculated distance of each of pixel areas of the target object are integrated, a distance image of the target object is generated.

At step S113, it is determined whether the processing is ended. When a measurement end request is received from the monitoring control apparatus 30, the determination at step S113 becomes an affirmative result, and when the measurement end request is not received from the monitoring control apparatus 30, the determination at step S113 becomes a negative result. For example, the monitoring control apparatus 30 transmits the measurement end request to the measurement control unit 23a when the electrical system of the vehicle 1 mounted with the LIDAR 20A is turned OFF. If the determination at step S113 is an affirmative result, the sequence is ended, and if the determination at step S113 is a negative result, the sequence returns to step S102.

As to the above described object detection process 6, information of the low-reflective objects such as position, size, and shape of the low-reflective objects can be detected with an enhanced precision by specifically measuring all of the low-reflective objects existing in the range finding region of the LIDAR 20A by increasing the SN ratio.

Further, the moving object used in the above described object detection process 4 can be changed to the low-reflective object in the above described object detection process 4.

Further, the above described object detection processes 1 to 6 includes the second step (i.e., step S2, S22, S42, S62, S82, S102) that determines whether the object exists. If the result of the second step is a negative result, a step of SN ratio enhancement process for the entire light emission region can be added, and the sequence can be returned to the second step after the SN ratio enhancement process. With this configuration, objects hard to be detected without enhancing the SN ratio such as a long distance object, a low-reflective object, a small object can be detected.

Further, along with the processes of setting the target area in the above described object detection processes 1 to 6, each of the object detection processes is performed for the background area (target-not-specified area) by emitting the light to the background area or by reducing the frame rate to detect an object in the background area as a preliminary detection, in which if a specific object is detected in one area in the background area, the one area is set as a target area, and then each of the object detection processes 1 to 6 can be performed for the target area, in which a detection area is changed from the background area to the target area.

(Second Embodiment)

Figure 20A:
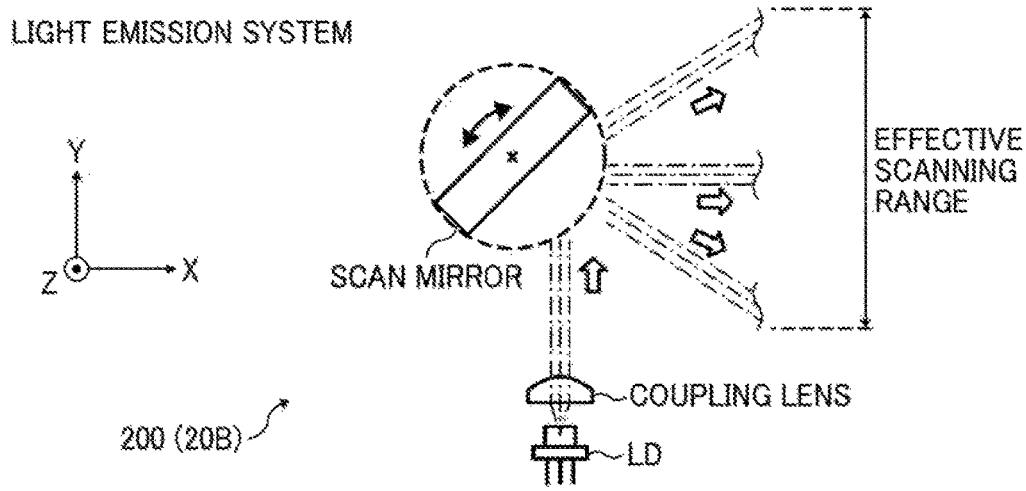
FIGS. 20A and 20B schematically illustrate an object detection apparatus of scanning type of a second embodiment of the present invention.
Figure 20B:
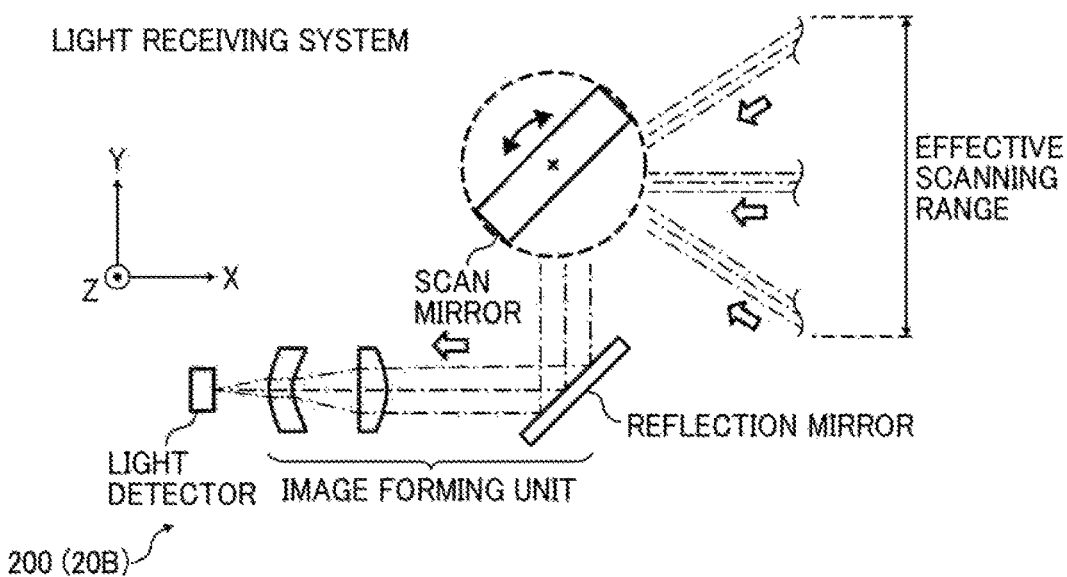

A description is given of an object detection apparatus 200 of a second embodiment with reference to FIGS. 20A and 20B. FIGS. 20A and 20B illustrate a configuration of the object detection apparatus 200 of the second embodiment. FIG. 20A illustrates a configuration of a light emission system (light emission unit 21) of a LIDAR 20B, used as the object detection apparatus 200, and FIG. 20B illustrates a configuration of a light receiving system (light receiving unit 22) of the LIDAR 20B.

Different from the LIDAR 20A of the first embodiment, the LIDAR 20B of the second embodiment includes a scan mirror that defectively scans the light emitted from the light source 21a disposed in the light emission system (light emission unit 21) to direct the light to an effective scanning range as described in FIG. 20A. Therefore, the LIDAR 20B is used as a scanning type LIDAR.

As to the LIDAR 20B, the scan mirror employs, for example, a micro-electromechanical systems (MEMS) mirror that drives a mirror unit by using a MEMS mechanism, but not limited thereto. For example, the scan mirror can employ a polygon mirror unit that a motor drives a polygon mirror, and a galvano mirror or the like.

As to the second embodiment, the light scanned by the MEMS mirror (scan light) to the light emission region (detection region) including the effective scanning range is reflected from the light emission region (detection region), and then detected by a light detection unit (e.g., photodiode, phototransistor). The measurement control unit 23a detects a position of the scan light (i.e., scan position) based on an output signal of the light detection unit, controls the light source 21a of the light emission system (light emission unit 21) based on the scan position. Further, if the MEMS mirror is disposed with an oscillation angle detector that detects an oscillation angle of the mirror, the measurement control unit 23a can detect the scan position based on an output signal of the oscillation angle detector.

Further, the scanning system includes the light emission system (light emission unit 21) and the light receiving system (light receiving unit 22) stacked in the Z-axis direction. When the light emission system (light emission unit 21) and the light receiving system (light receiving unit 22) are viewed from the Z-axis direction in FIG. 20, the light enters the scan mirror and scans along the same axis, in which a region emitted by the light from the light emission system (light emission unit 21) and a region to receive the light by the light receiving system (light receiving unit 22) can be matched, with which the object detection process can be performed with a stable manner.

As a variant example of the second embodiment, the scan mirror is set for the light emission system (light emission unit 21) alone while the light receiving system (light receiving unit 22) includes the image forming unit 22b same as the first embodiment to observe the entire effective scanning range without using the scan mirror.

In this configuration, a space to set the scan mirror is not required in the light receiving system (light receiving unit 22), and the size of the scan mirror can be reduced in the light emission system (light emission unit 21), with which the high speed operation and the wide angle range operation can be performed.

In FIG. 20, the effective scanning range is set parallel to the YZ plane, and the scan mirror can be moved in the two-axis direction such as Y-axis direction and Z-axis direction separately to scan the light. When the scan mirror is replaced by a polygon mirror having a plurality of reflection faces, each of the reflection faces can be angled with respect to the rotation axis of the polygon mirror to scan and detect the light in Z-axis direction.

A description is given of a method of emitting or irradiating light to the target area in the second embodiment.

Similar to the first embodiment, when an area where the object A exists is set as the target area based on a result of the object detection process (i.e., distance image) described in FIG. 6, the drive mode of the scanning device such as the MEMS mirror is switched to non-resonant mode, and then the MEMS mirror is driven with an angle to deflect the light to the target area alone.

The distance to the target area can be detected with an enhanced precision by acquiring signals by repeatedly scanning the target area because the signal-to-noise (SN) ratio can be increased by acquiring the signals by repeatedly scanning the target area. When controlling the moveable apparatus to evade the object A, the size and shape contours of the object A is required to be detected with an enhanced precision compared to the distance information to determine the movement allowable area of the moveable apparatus, in which the MEMS mirror is driven to emit the light mainly to the contours of the object A to achieve a higher speed operation and the enhanced the SN ratio.

Further, when the drive mode of the scanning device is not switched to the non-resonant mode, but the drive mode of the scanning device is the resonant mode, the MEMS mirror scans the entire effective scanning range under the resonant mode by enhancing the SN ratio of the received light signals by increasing the peak light intensity of the emission light pulse, wherein the peak light intensity of the emission light pulse can be increased by setting a shorter light emission cycle for the light source 21a used for scanning the target area, by setting a greater light emission duty for the light source 21a, and/or by increasing the amplitude of the drive current input to the light source 21a. This method can be effective for an optical deflector such as a polygon mirror that cannot limit the deflection movement to one region only.

Further, if the light emission cycle and the light emission duty of the light source 21a cannot be changed due to the drive condition limitation of the light source 21a, the MEMS mirror is set with the non-resonant mode to emit the light to the target area, and the number of light emission times to the target area can be increased by setting a slower scan speed.

By using the above described LIDAR 20B of the second embodiment, the above described threshold setting processing, the SN ratio enhancement processes 1 to 3, and the object detection processes 1 to 6 can be performed effectively.

(Third Embodiment)

Figure 21A:
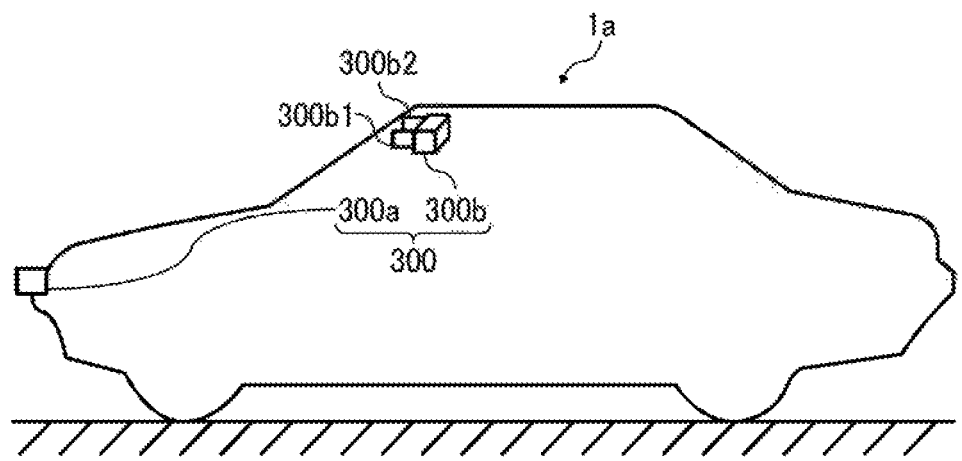
FIG. 21A is a side view of a vehicle mounted with an object detection apparatus of a third embodiment including a LIDAR and a stereo camera.
Figure 21B:
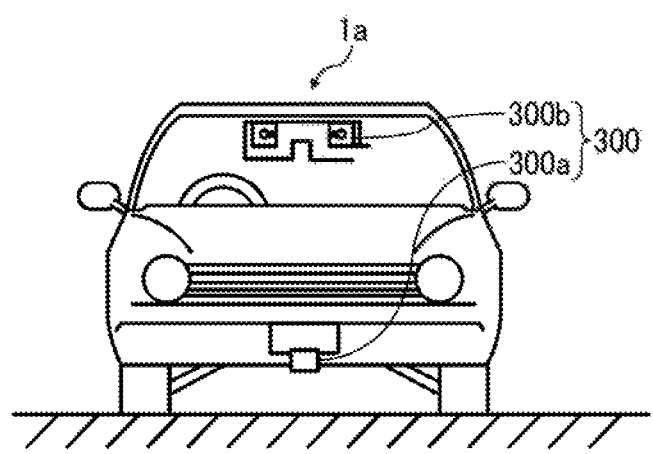
FIG. 21B is a front view of the vehicle of FIG. 21A.

A description is given of an object detection apparatus 300 of a third embodiment with reference to FIGS. 21A and 21B. FIGS. 21A and 21B illustrate a side view and a front view of a vehicle 1a, which a moveable apparatus, mounted with the object detection apparatus 300 of the third embodiment. The object detection apparatus 300 includes, for example, a LIDAR 300a and a stereo camera 300b.

The LIDAR 300a has a configuration similar to the LIDAR 20 of the first embodiment or the LIDAR 20B of the second embodiment. For example, the LIDAR 300a is mounted near a number plate at a front face of the vehicle 1a or the LIDAR 300a can be mounted inside the vehicle 1a. When the LIDAR 300a is mounted inside the vehicle 1a, a part of the light emitted from the LIDAR 300a may reflect on a windshield of the vehicle 1a.

The stereo camera 300b can be mounted, for example, near a rear view mirror of the vehicle 1a. The stereo camera 300b includes an image capture 300b1 at a left side, and an image capture 300b2 at a right side. A disparity image acquired from an image captured by the image capture 300b1 and an image captured by the image capture 300b2 is used to detect distance information in the detection region. Further, the stereo camera 300b can be mounted exterior of the vehicle 1a, but a lens of the stereo camera 300b may be contaminated by stains.

Figure 22:
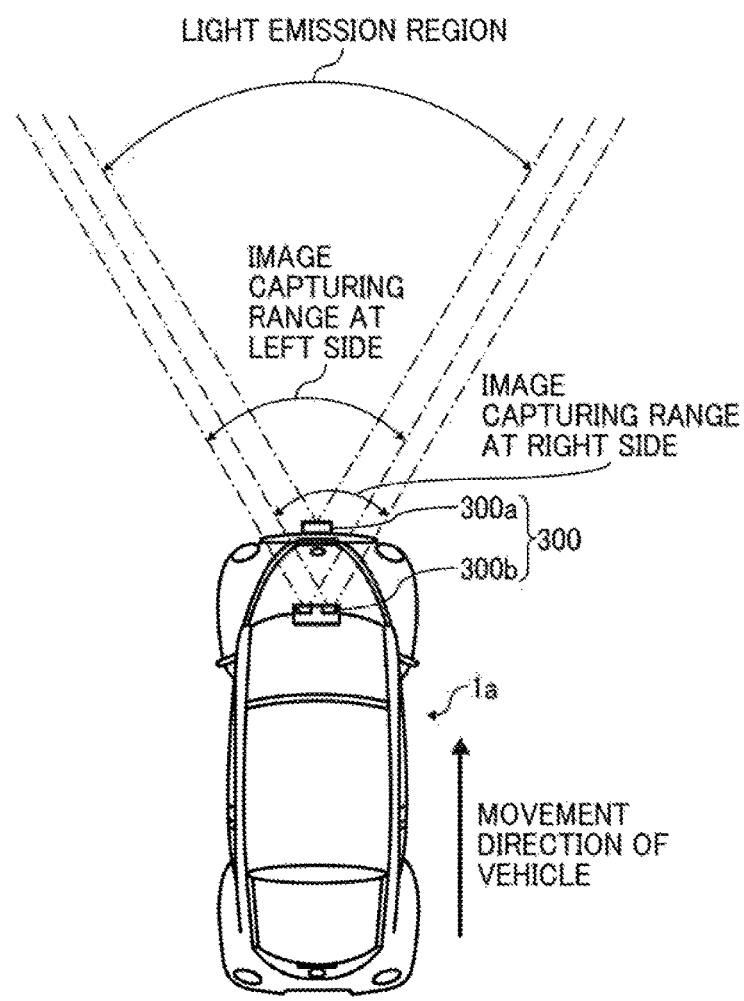
FIG. 22 illustrates a light emission region and an image capturing range of the object detection apparatus of the third embodiment.

FIG. 22 illustrates a light emission region of the LIDAR 300a and an image capturing range of the stereo camera 300b. As described in FIG. 22, an image capturing range of the image capture 300b1 (i.e., image capturing range at left side) and an image capturing range of the image capture 300b2 (i.e., image capturing range at right side) have an overlapping region, and the overlapping region includes the light emission region of the LIDAR 300a. The overlapping region can be matched to the light emission region, or the overlapping region can be included in the light emission region.

As to the third embodiment, a captured image result of the stereo camera 300b is used to set a target area.

Typically, the stereo camera has a higher angular resolution compared to the LIDAR, and can detect smaller objects. However, since the stereo camera is hard to enhance the distance resolution as the distance to an object becomes farther, the stereo camera cannot detect the distance to the object with an enhanced precision.

Therefore, the existence and non-existence of the object in the entire light emission region is detected by using the stereo camera 300b at first, and then the target area is set, and the searching mode shifts to the specific area observation mode. After setting the target area, the distance to the object is detected by using the LIDAR while increasing the signal-to-noise (SN) ratio of the target area, with which information of the long distance object and the low-reflective object can be detected with the enhanced precision compared to the entire area observation mode.

As to the above described third embodiment, the LIDAR and the stereo camera are combined, but not limited thereto. For example, the LIDAR and a single camera can be combined to achieve the same effect. When the single camera is used, an image of an object can be captured by using, for example, an optical filter to generate blurring and deviation for each of pixels, and the distance information to the object is acquired for each of the pixels based on the blurring level and the deviation level.

Further, the LIDAR can be combined with other sensing device. For example, the LIDAR can be combined with a millimeter-wave radar. Compared to the LIDAR, the millimeter-wave radar has good weather-worthiness such as the millimeter-wave radar can detect an object with a good reliability when weather is rain or fogging. However, the millimeter-wave radar may be hard to increase the detection region angle and to enhance the angular resolution at the same time. Therefore, the object detection process is performed when weather is bad, an object detection process is preliminary performed by the millimeter-wave radar to determine the target area at first, and then the object detection process is further performed by the LIDAR while increasing the signal-to-noise (SN) ratio of the target area. With this configuration, the object detection process can be performed with the enhanced precision under the bad weather compared to the entire area observation mode.

Figure 23:
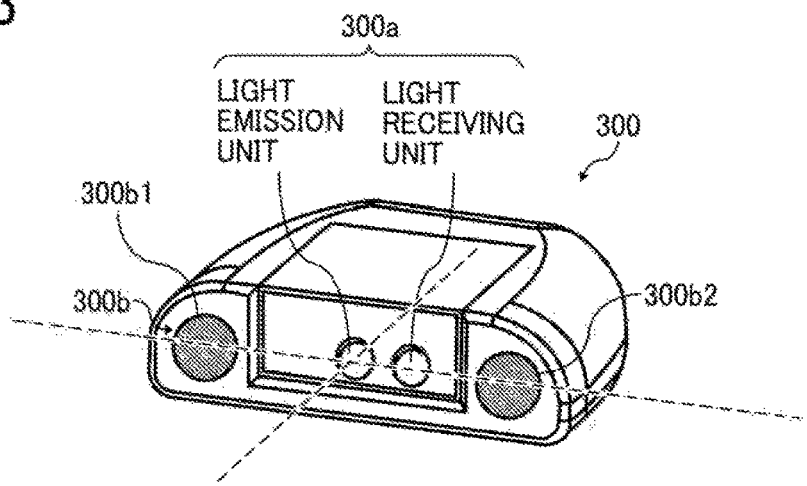
FIG. 23 illustrates an object detection apparatus including a LIDAR and a stereo camera as one integrated unit.

Further, as to the above described third embodiment, the object detection apparatus 300 includes the LIDAR 300e and the stereo camera 300b as separate units, but not limited thereto. For example, as described in FIG. 23, the LIDAR 300a and the stereo camera 300b can be integrated as one unit, and then mounted, for example, near a number plate of the vehicle 1 and/or near a rear view mirror of the vehicle 1.

By using the above described object detection apparatus 300 of the third embodiment, the above described threshold setting processing, the SN ratio enhancement processes 1 to 3, and the object detection processes 1 to 6 can be performed effectively.

(Fourth Embodiment)

Figure 24:
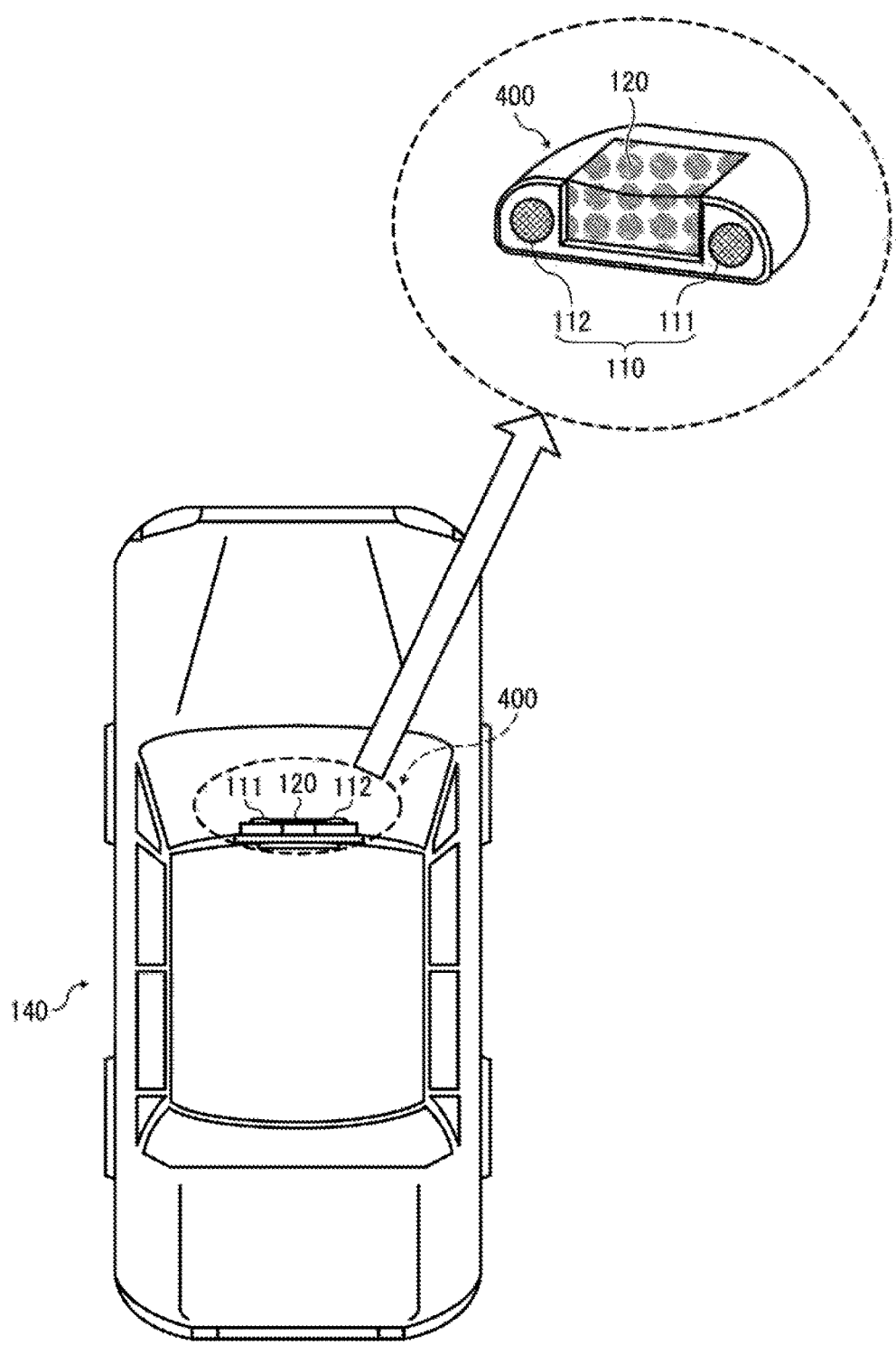
FIG. 24 illustrates a perspective view of an object detection apparatus of a fourth embodiment, and an installation of the object detection apparatus.

A description is given of an object detection apparatus 400 of a fourth embodiment with reference to FIG. 24. FIG. 24 illustrates a perspective view of the object detection apparatus 400 and an installation of the object detection apparatus 400.

As described in the upper part of FIG. 24, the object detection apparatus 400 includes, for example, a stereo camera 110 and a LIDAR 120 (laser radar) as a sensor unit (three dimensional sensor) to acquire surrounding area information as three dimensional information. The stereo camera 110 includes, for example, a first single camera unit 111 (first image capturing unit) and a second single camera unit 112 (second image capturing unit). The LIDAR 120 is disposed between the first single camera unit 111 and the second single camera unit 112.

The first single camera unit 111 and the second single camera unit 112 captures images by synchronizing with each other with a given frame rate to generate captured images. The LIDAR 120 emits the laser light, and receives the reflection light to measure a distance to an object irradiated by the light.

As described in the lower part of FIG. 24, the object detection apparatus 400 can be mounted, for example, at a center of an inside of a windshield of a vehicle 140, in which the stereo camera 110 and the LIDAR 120 are both mounted by facing a forward direction of the vehicle 140. Therefore, when the object detection apparatus 400 is mounted to the vehicle 140, the image capture direction of the stereo camera 110 and the emission direction of the laser light of the LIDAR 120 becomes the same direction.

(Hardware Block Diagram of Object Detection Apparatus)

Figure 25:
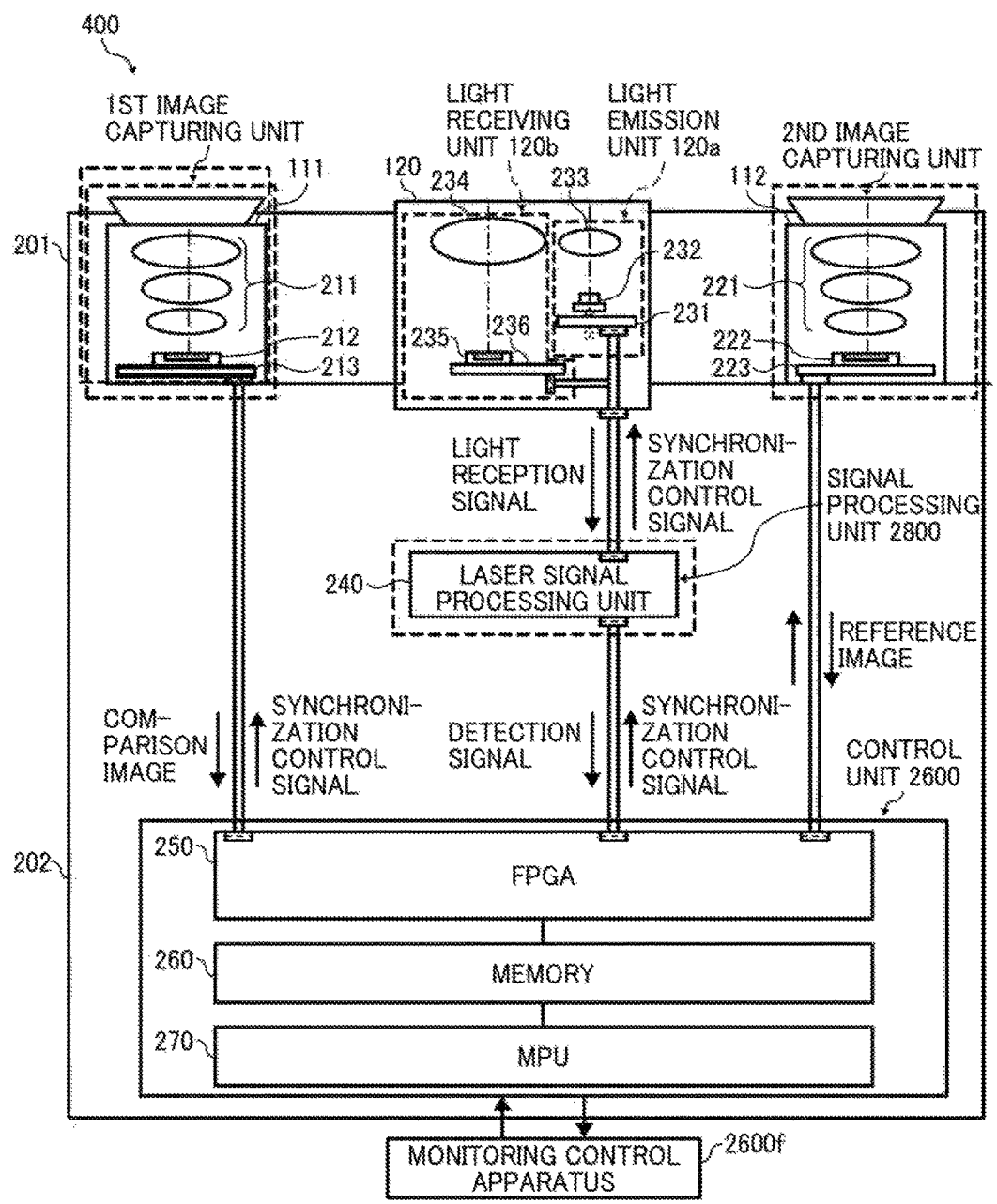
FIG. 25 illustrates an example of a hardware block diagram of the object detection apparatus of the fourth embodiment.

A description is given of an example of a hardware block diagram of the object detection apparatus 400 with reference to FIG. 25. As described in FIG. 25, the object detection apparatus 400 includes, for example, a frame 201, and a control board unit 202.

The first single camera unit 111 and the second single camera unit 112, and the LIDAR 120 are attached to the frame 201. With this configuration, the object detection apparatus 400 can be designed compact in size and can be manufactured with lower cost.

The control board unit 202 includes a signal processing unit 2800 including a laser signal processing unit 240, a control unit (control system) 2600 including a distance calculation processing unit 250 such as a FPGA, a memory 260, and a micro processing unit (MPU) 270. By disposing the laser signal processing unit 240 separately from the LIDAR 120, the LIDAR 120 can be designed compact in size. With this configuration, the LIDAR 120 can be disposed between the first single camera unit 111 and the second single camera unit 112 in the fourth embodiment.

In an example configuration of FIG. 25, the laser signal processing unit 240 and the distance calculation processing unit 250 are different circuit boards, but the laser signal processing unit 240 and the distance calculation processing unit 250 can be configured on the same circuit board because the control board unit 202 can be manufactured with lower cost by reducing the number of the circuit boards.

A description is given of each units in the frame 201. As described in FIG. 25, the first single camera unit 111 (first image capturing unit) includes, for example, a lens 211, an image capture element 212, and a sensor board 213. When light enters the first single camera unit 111 through the lens 211, the light is received by the image capture element 212, and then converted to signals with a given flame rate by performing the photoelectric conversion. The converted signals are processed by the sensor board 213 to generate a captured image for each frame. The generated captured images are sequentially transmitted to the distance calculation processing unit 250 as a comparison image.

The second single camera unit 112 (second image capturing unit) has a configuration same as the first single camera unit 111. The second single camera unit 112 generates captured images by synchronizing the second single camera unit 112 with the first single camera unit 111 based on a synchronization control signal, and the generated captured images are sequentially transmitted to the distance calculation processing unit 250 as a reference image.

The LIDAR 120 includes, for example, a light emission unit including a light source drive circuit 231, a laser light source 232, and a light emission lens 233. The light source drive circuit 231 is operated based on the synchronization control signal from the laser signal processing unit 240, and applies a modulated current (i.e., light source drive signal) to the laser light source 232. With this configuration, the laser light is emitted from the laser light source 232. The laser light emitted from the laser light source 232 goes outside via the light emission lens 233.

As to the fourth embodiment, the laser light source 232 employs, for example, an infrared semiconductor laser diode (LD) that emits near infrared having a wavelength of 800 nm to 950 nm as the laser light. Further, the laser light source 232 periodically emits the laser light having a pulse pattern based on the modulated current (i.e., light source drive signal) applied from the light source drive circuit 231. Further, the laser light source 232 periodically emits the laser light having a pulse pattern having a pulse width of several nano seconds to several hundreds nano seconds.

The laser light having the pulse pattern emitted from the laser light source 232 exits outside the light emission unit via the light emission lens 233, and then irradiated to a given light emission region. The light emission region can be set larger than the image capturing range of the first single camera unit 111 and the second single camera unit 112. When the light emission region is enlarged, the angular resolution of the light emission unit and the light receiving unit is required to be increased. Therefore, the light emission unit may preferably use a surface emitting laser array having a multiple light emitting elements as the laser light source, and the light receiving unit may preferably use a plurality of photodiodes arrayed with a pattern to set a plurality of light reception areas.

The LIDAR 120 includes, for example, the light receiving unit including a light reception lens 234, a light receiving element 235, and a received signal amplifier 236. The laser light emitted or irradiated to an object is diffused at the object. Then, the light component, reflected from the object along the same light path of the laser light, emitted from the LIDAR 120, is guided to the light receiving element 235 through the light reception lens 234 as the reflection light.

As to the fourth embodiment, the light receiving element 235 employs, for example, silicon PIN photodiode, avalanche photodiode or the like. The light receiving element 235 performs the photoelectric conversion to the reflection light to generate a light reception signal, and transmits the generated light reception signal to the received signal amplifier 236. The received signal amplifier 236 amplifies the generated light reception signal, and then transmits the amplified light reception signal to the laser signal processing unit 240.

A description is given of each units in the control board unit 202. The laser signal processing unit 240 is used as the signal processing unit including the averaging/accumulating processing unit and the binarization processing unit to process the light reception signal received from the LIDAR 120. The laser signal processing unit 240 transmits the processed signal to the distance calculation processing unit 250 as a detection signal.

The distance calculation processing unit 250 is configured, for example, as integrated circuit such as field-Programmable gate array (FPGA) and application specific integrated circuit (ASIC). The distance calculation processing unit 250 outputs the synchronization control signal to the first single camera unit 111, the second single camera unit 112, and the laser signal processing unit 240 to control the image capture timing and the light emission timing and the light reception timing of the laser light. The distance calculation processing unit 250 can be configured as a circuit board including a CPU, a ROM, and a RAM.

The distance calculation processing unit 250 generates a disparity image based on the comparison image transmitted from the first single camera unit 111 and the reference image transmitted from the second single camera unit 112. The disparity image can be generated by using known matching processing such as SSD (step Sum of Squared Difference), ZSSD (Zero-mean Sum of Squared Difference), SAD (step Sum of Absolute Difference), and ZSAD (Zero-mean Sum of Absolute Difference). Further, the distance calculation processing unit 250 sets the target area based on cluster information of the disparity image analyzed by MPU 270, and transmits information of the target area with the synchronization control signal to the laser signal processing unit 240 to control the laser light source and the laser signal processing unit 240. Further, the distance calculation processing unit 250 generates the distance information based on the detection signal transmitted from the laser signal processing unit 240. The distance calculation processing unit 250 stores the generated disparity image, and the distance information in the memory 260. The method of calculating the distance based on the detection signal transmitted from the laser signal processing unit 240 is same as the first embodiment.

The memory 260 stores the disparity image, and the distance information generated by the distance calculation processing unit 250. Further, the memory 260 can be used as a working area when the distance calculation processing unit 250 and the MPU 270 perform various processing.

The MPU 270 controls each units in the control board unit 202, and analyzes the disparity image and the distance information stored in the memory 260. The analysis includes a cluster analysis or clustering and the object detection process. For example, the cluster analysis is a process of linking pixels having closet disparity values in the disparity image as one cluster. The cluster analysis can be performed after converting disparity of each pixel of the disparity image to actual space unit, and then converting the actual space unit to three dimensional information.

The cluster information calculated by the cluster analysis includes size information, position information, and color information (e.g., RGB information) of an object existing as each cluster. Further, the cluster information can include movement information of each cluster such as speed information and movement vector information by using a cluster composed of a plurality of frames.

The MPU 270 performs the cluster analysis to the distance image, performs the object detection process based on the cluster information calculated from the disparity image and the distance information. The cluster analysis that detects an object from the disparity image and the distance image can be performed any methods. For example, the cluster analysis or clustering can be performed by using K-MEANS method, CLARANS method, BIRCH method, and CURE method.

(Software Module of Control Unit)

Figure 26:
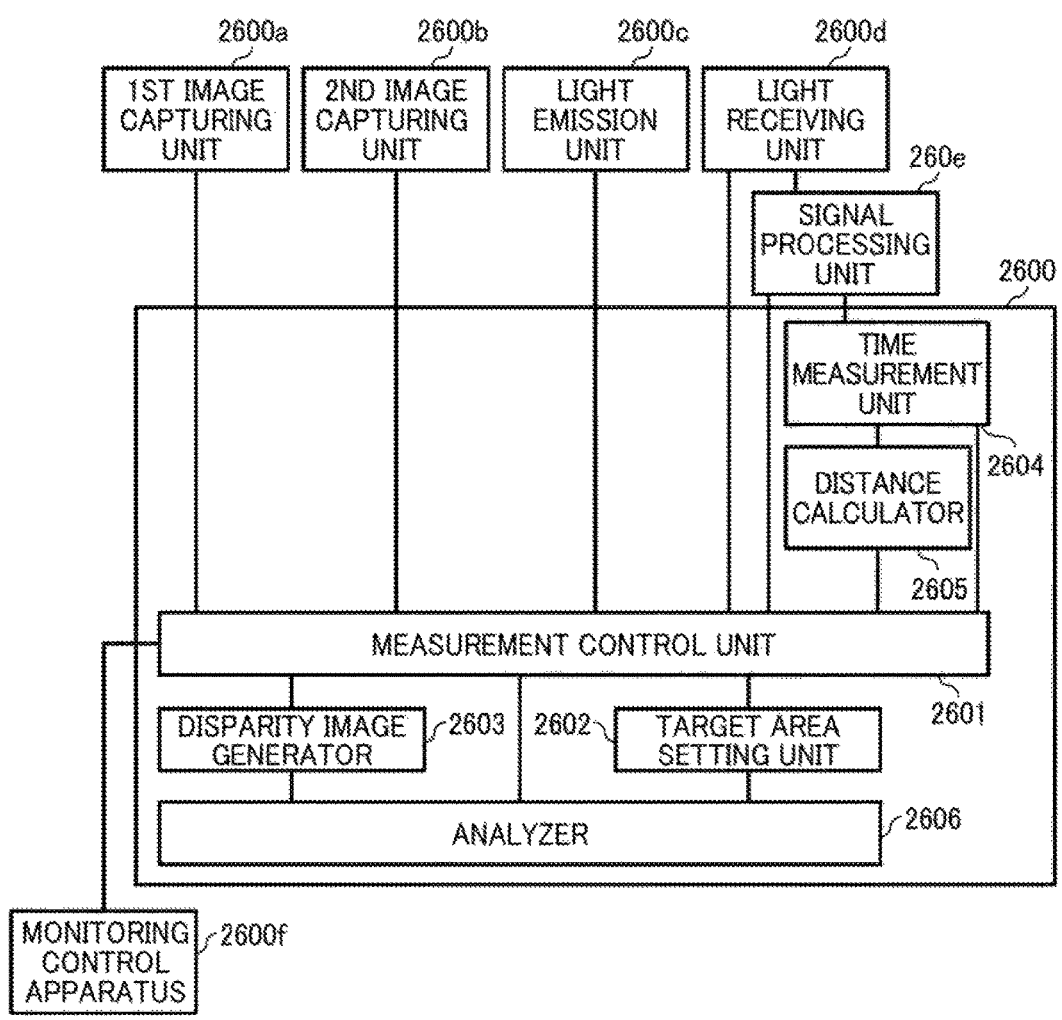
FIG. 26 is an example of a functional block diagram of a control unit of the object detection apparatus of the fourth embodiment.

A description is given of a software module of the control unit (control system) 2600 of the object detection apparatus 400. FIG. 26 is an example of a functional block diagram of the control unit (control system) 2600 of the object detection apparatus 400.

As described in FIG. 26, the control unit 2600 includes a measurement control unit 2601, a target area setting unit 2602, a disparity image generator 2603, an analyzer 2606, a time measurement unit 2604, and a distance calculator 2605. Each of the units can be devised by the FPGA 250, the memory 260, and the MPU 270 of FIG. 25.

The measurement control unit 2601 is activated under the control of the monitoring control apparatus 2600f receives a signal respectively from the first image capturing unit, the second image capturing unit, the light emission unit, the light receiving unit, and the signal processing unit, and controls each of the first image capturing unit, the second image capturing unit, the light emission unit, the light receiving unit, and the signal processing unit. Further, the measurement control unit 2601 performs the detection precision enhancement process of the target area to at least any one of the light receiving unit, the light emission unit, and the signal processing unit based on the target area set by the target area setting unit 2602. For example, the measurement control unit 2601 performs the detection precision enhancement process of the target area by increasing the light emission intensity set for the target area, by setting the shorter light emission cycle for the target area, by increasing the number of times of accumulating the plurality of the received light signals for the target area, and/or by reducing the frame rate set for the target area.

The disparity image generator 2603 generates the disparity image based on the reference image and the comparison image acquired from the first image capturing unit, the second image capturing unit.

The analyzer 2606 performs the cluster analysis or clustering to the disparity image generated by the disparity image generator 2603, and transmits the cluster information to the target area setting unit 2602. Further, the analyzer 2606 performs the object detection process based on the distance information acquired from the signal processing unit after performing the detection precision enhancement process of the target area at the measurement control unit 2601, and the cluster information.

The target area setting unit 2602 sets the target area based on the cluster information acquired from the analyzer 2606.

The time measurement unit 2604 and the distance calculator 2605 of the fourth embodiment are similar to the time measurement unit and the distance calculator of the first embodiment. Different from the first embodiment, the distance calculator 2605 transmits distance data to the measurement control unit 2601 alone, and the measurement control unit 2601 transmits the distance data to the monitoring control apparatus 2600f in the fourth embodiment.

(Hardware Block Diagram of Control Unit)

Figure 27:
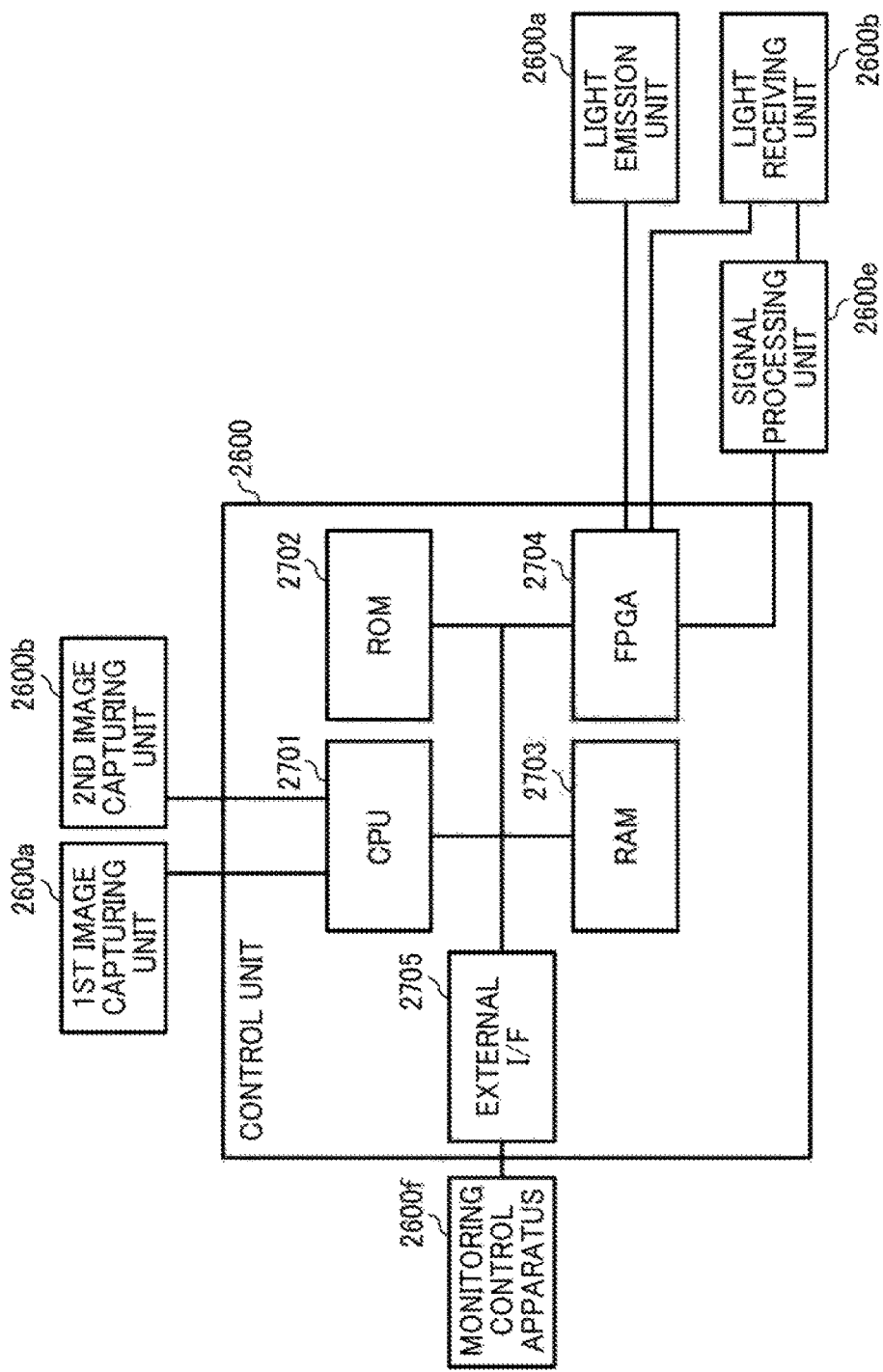
FIG. 27 illustrates an example of a hardware block diagram of the control unit of the object detection apparatus of the fourth embodiment.

A description is given of a hardware block diagram of the control unit 2600 of the object detection apparatus 400 with reference to FIG. 27. FIG. 27 is an example of a hardware block diagram of the control unit 2600 of the object detection apparatus 400.

As described in FIG. 27, the control unit 2600 of the object detection apparatus 400 can be configured with a CPU 2701, a RAM 2703, a ROM 2702, a FPGA 2704, and an external interface (I/F) 2705. Specifically, the disparity image generator 2603 in FIG. 26 can be configured by the FPGA 2704, and the measurement control unit 2601, the target area setting unit 2602, and the analyzer 2606 in FIG. 26 can be configured by the CPU 2701.

(Object Detection Process 7)

Figure 28:
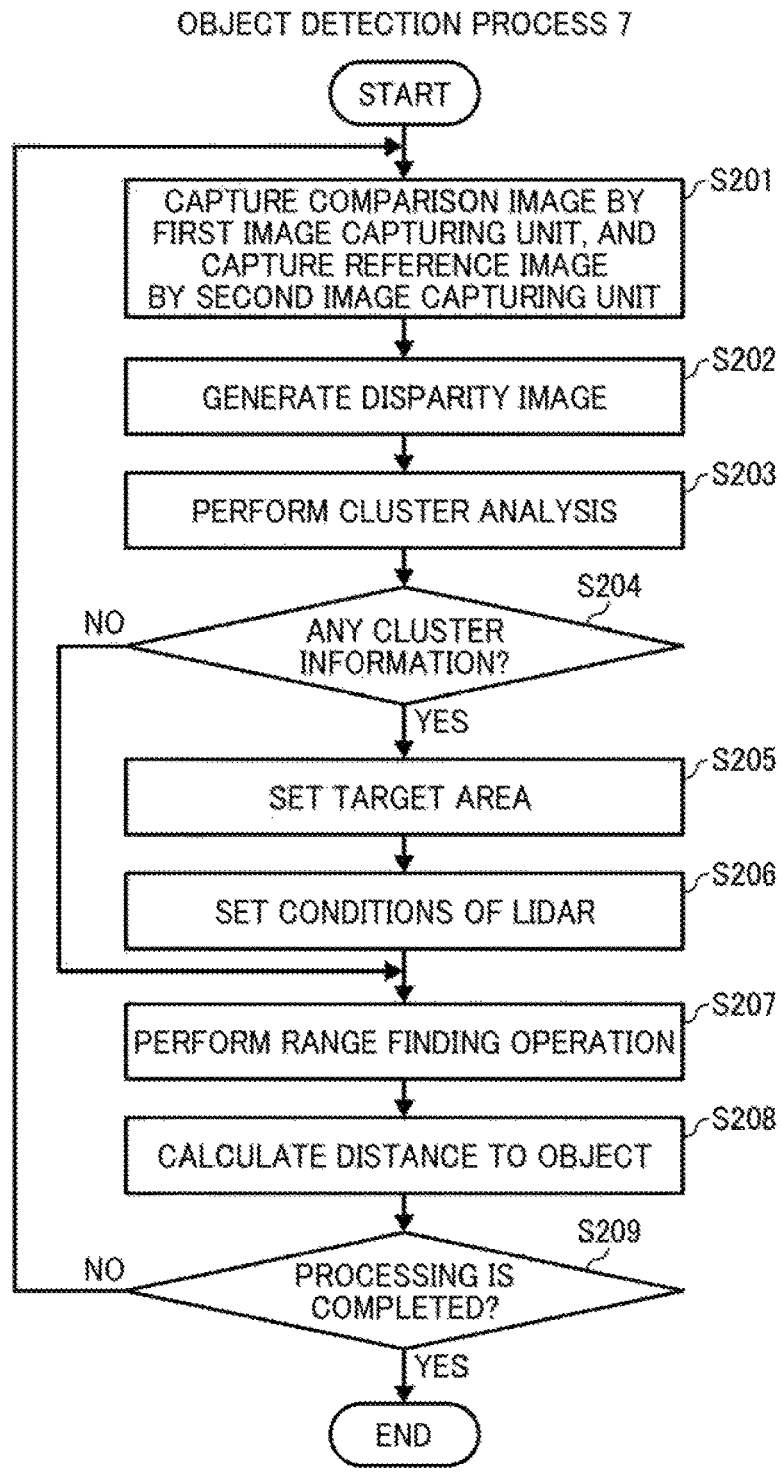
FIG. 28 is a flow chart showing steps of another process of detecting an object (object detection process 7).

A description is given of the object detection process 7 of the fourth embodiment with reference to FIG. 28. FIG. 28 is a flow chart showing steps of another process of detecting an object based on a processing algorithm performable by the measurement control unit 2601. The object detection process 7 is started when the measurement start request is received from the monitoring control apparatus 2600f. For example, the monitoring control apparatus 2600f transmits the measurement start request to the object detection apparatus such as LIDAR 20A when the electrical system of the vehicle 1 mounted with the LIDAR 20A is turned ON.

At step S201, a reference image is captured by the first image capturing unit, and a comparison image is captured by the second image capturing unit by synchronizing with the first image capturing unit.

At step S202, the disparity image generator 2603 performs the matching processing to the reference image and the comparison image, calculates a disparity of the reference image and the comparison image to generate a disparity image.

At step S203, the analyzer 2606 performs the cluster analysis or clustering. Specifically, the analyzer 2606 performs the clustering based on disparity values in the disparity image, generates cluster information including size information, position information, and movement information of each cluster, and outputs the cluster information to the target area setting unit 2602.

At step S204, the measurement control unit 2601 determines whether the analyzer 2606 outputs the cluster information. If the analyzer 2606 does not output the cluster information, the sequence proceeds to step S207, and if the analyzer 2606 outputs the cluster information, the sequence proceeds to step S205.

At step S205, the target area setting unit 2602 sets a target area based on the cluster information.

At step S206, the measurement control unit 2601 performs the detection precision enhancement process of the target area to at least any one of the light receiving unit, the light emission unit, and the signal processing unit. For example, For example, the measurement control unit 2601 performs the detection precision enhancement process of the target area by increasing the light emission intensity set for the target area, by setting the shorter light emission cycle for the target area, by increasing the number of times of accumulating the plurality of the received light signals for the target area, and/or by reducing the frame rate set for the target area.

At step S207, under the control of the measurement control unit 2601, the LIDAR including the light emission unit, the light receiving unit, and the signal processing unit performs the range finding operation to acquire distance information.

At step S208, based on the cluster information and the distance information, the distance to the object existing in the detection region is measured. If the distance to the object measured based on the cluster information and the distance to the object based on the distance information are different, the distance information is used at first.

At step S209, it is determined whether the processing is ended. When a measurement end request is received from the monitoring control apparatus 2600f 30, the determination at step S209 becomes an affirmative result, and when the measurement end request is not received from the monitoring control apparatus 2600*f* 30, the determination at step S209 becomes a negative result.

In the above described the object detection process 7, the target area is set by using the cluster information, and the detection precision enhancement process of the target area is performed to enhance the range detection precision of the LIDAR, which the target cluster can be measured with the enhanced precision. For example, by enhancing the range detection precision of the LIDAR for a cluster area existing at the closest range from the LIDAR, the closest object that may collide with the vehicle mounted with the LIDAR can be detected with the enhanced precision. The non-scanning type LIDAR is used in the fourth embodiment same as the first embodiment, but the scanning type LIDAR can be also used in the fourth embodiment same as the second embodiment.

As to the above described the first to fourth embodiments, each of the object detection apparatuses 100, 200, 300 and 400 can employ, for example, a first configuration including the light emission unit having the light source to emit light, the light receiving unit including the light detector having the light receiving element to receive light reflected from an object, the signal processing unit to be input with an output signal of the light detector or a signal that is acquired by processing the output signal of the light detector such as a signal obtained by performing the averaging and accumulating processing to the output signal of the light detector, the control unit to set at least one area in a light emission region of the light emission unit as a target area, and to set at least one of a light emission condition of the light emission unit and a processing condition of the signal processing unit such that the at least one of the light emission condition and the processing condition are different between a time when the light is emitted to the target area in the light emission region and a time when the light is emitted to a background area in the light emission region.

In this configuration, for example, the control unit can set at least any one of the light emission condition and the processing condition for the target area when the light is emitted to the target area with an advantageous condition compared the light emission condition and the processing condition when the light is emitted to the background area (target-not-specified area) to detect information of the object, with which information of the object (specific object) existing in the target area can be detected with the enhanced precision compared to information of the object existing in the background area (target-not-specified area).

With this configuration, the detection precision of information of the specific object (i.e., object information) can be enhanced.

Further, as to the first to fourth embodiments, each of the object detection apparatuses 100, 200, 300 and 400 can employ, for example, a second configuration including the light emission unit having the light source to emit light, the light receiving unit including the light detector having the light receiving element to receive light reflected from an object, the signal processing unit including the binarization processing unit (signal detector) to be input with an output signal of the light detector or a signal that is acquired by processing the output signal of the light detector such as a signal obtained by performing the averaging and accumulating processing to the output signal of the light detector, and the control unit to set at least one area in a light emission region of the light emission unit as a target area, and to control at least one of the light emission unit and the signal processing unit such that the signal detector detects the output signal of the light detector or a signal that is acquired by processing the output signal of the light detector when the light is emitted to the target area.

In this configuration, when the light is emitted to the target area, the output signal of the light detector (i.e., signal based on a reflection light reflected from an object existing in the target area) can be detected with the enhanced precision.

With this configuration, the detection precision of information of the specific object (i.e., object information) can be enhanced.

Therefore, the object detection apparatuses 100, 200, 300 and 400 of the first to fourth embodiments can detect information of the object such as the existence and non-existence of the object, distance to the object, position, size, and shape of the object for any objects with the enhanced precision under various conditions such as the distance condition to the object, the movement or not movement condition of the object, reflectance condition, size and shape condition of the object. Conventionally, due to the greater light loss associated to long distance objects, low-reflective objects, and small objects, the long distance objects, low-reflective objects, and small objects are hard to be detected effectively, but the object detection apparatuses 100, 200, 300 and 400 of the first to fourth embodiments can effectively detect such objects.

As to the object detection apparatuses 100, 200, 300 and 400 of the first to fourth embodiments, after setting the target area, the signal-to-noise (SN) ratio can be enhanced by performing the above described controlling in the system, with which objects hard to be detected by conventional methods can be detected, which means information of the long distance object, low-reflective object, and the small object can be detected.

Further, the control unit can control the light emission unit so that the light emission intensity of the light emitted to the target area becomes greater than the light emission intensity of the light emitted to the background area (target-not-specified area).

In this configuration, the light intensity of reflection light from the target area can be increased, with which the signal-to-noise (SN) ratio of the received light signals can be enhanced.

Further, the control unit can control the light emission unit so that the light emission cycle for the target area becomes shorter than the light emission cycle for the background area (target-not-specified area).

In this configuration, the number of light reception times of the reflection light from the target area can be increased, with which the signal-to-noise (SN) ratio of the received light signals can be enhanced.

Further, the control unit can control the light emission unit to emit the light to the target area for a plurality of times continuously, in which the light detector receives the reflection light from the object for a plurality of times continuously. The signal processing unit can further include the averaging/accumulating processing unit that performs the averaging/accumulating processing of a plurality of the output signals received from the light detector that receives the reflection light from the object for the plurality of times continuously, and outputs the signals to the binarization processing unit. Specifically, for example, a capacitor to accumulate signal charges received from the light detector can be disposed. When the light detector performs the photoelectric conversion to the received light to generate signal charges, the signal charges can be accumulated in the capacitor, and the number of accumulation times for each frame can be increased. The signal charges accumulated in the capacitor can be increased by reducing the frame rate or by increasing the light emission frequency (i.e., setting shorter light emission cycle).

In this configuration, by receiving the signal light (reflection light) from the object existing in the target area for a plurality of times continuously, the signal level of the signal light can be increased, with which the signal-to-noise (SN) ratio can be enhanced.

Further, the threshold TH used for the signal detection operation is set in the binarization processing unit 24b. Specifically, the control unit acquires the disturbance noise level (noise level) from an output signal of the light detector when the light emission unit does not emit the light, and the threshold TH is set in view of the disturbance noise level.

In this configuration, the signal level of signal light (reflection light) reflected from the object existing in the target area can be controlled with a value that is effectively greater than the disturbance noise level, with which the signal-to-noise (SN) ratio can be enhanced. Further, by setting the threshold greater than the disturbance noise level, an erroneous detection can be prevented.

The noise level can be determined by detecting the signal level of the light when the light source is turned OFF, and the noise level can be retained in a memory. When the light source is turned ON, the noise level is subtracted from the signal level of the light received by the light detector to obtain a signal level of the signal light removing the noise level. The light emission intensity, the light emission cycle, and/or the charge accumulation time can be increased so that the signal level of the signal light t becomes greater than a given value to enhance the signal-to-noise (SN) ratio. If the noise level is already determined, the noise level and the signal level of the signal light can be compared as the signal-to-noise (SN) ratio without subtracting the noise. By setting the SN ratio greater than the given value, the objection detection apparatus can be driven with the enhanced SN ratio.

Further, when no object exists in the light emission region, the control unit sets the light emission condition of the light emission unit and the processing condition of the signal processing unit for the entire light emission region similar to the light emission condition of the light emission unit and the processing condition of the signal processing unit set for the target area. If no object is detected in the entire detection region, which means if no object exists near the object detection apparatus, the detection of object information can be performed with a longer time period. For example, the signal-to-noise (SN) ratio can be enhanced by reducing the frame rate, with which information of the long distance object, the low-reflective object, and the small object can be detected. With this configuration, the surrounding area information can be predicted with a longer advance time period.

Further, the control unit can control the light source to emit the light to the target area alone after setting the target area. In this configuration, the lifetime and the power saving of the light source can be devised.

Further, the control unit can set the target area based on an output signal of the signal processing unit when the light is emitted from the light emission unit. Specifically, the existence and non-existence of the object, the position information of object, and the movement or not movement of the object can be calculated based on detection results of previous frames detected by the LIDAR, and then the target area can be set.

In this configuration, the target area can be set without using other sensing device.

Further, as to the object detection apparatus 200 of the second embodiment, the light emission unit can further include the scanning device to scan the light emitted from the light source, and the control unit controls at least any one of the light source and the scanning device.

The scanning device can be, for example, a MEMS mirror and a polygon mirror. When the MEMS mirror is employed, the MEMS mirror can be set still with one deflection angle when only the target area is scanned, or when the target area is one point to deflect the light beam to the target area or the one point alone. When the polygon mirror is employed, the light source is turned ON while only the target area is scanned when rotating the polygon mirror, with which the light ON time of the light source can be decreased, and then the lifetime of the light source can be set longer, and the signal-to-noise (SN) ratio for the target area can be increased by increasing the light intensity to the target area alone, and/or by increasing the accumulation time.

Further, the scan speed of the scanning device set for the target area can be set slower than the scan speed set for the background area (target-not-specified area) by setting the constant drive condition for the light source. In this configuration, the number of emission times of the light to the target area can be increased, and the light intensity density at the target area can be increased, with which the signal-to-noise (SN) ratio of the received light signals can be enhanced.

Further, the light emission cycle of the light source set for the target area can be set shorter by setting the constant operation condition to the scanning device. In this configuration, the number of emission times of the light to the target area can be increased, and the light intensity density at the target area can be increased, with which the signal-to-noise (SN) ratio of the received light signals can be enhanced.

Further, the object detection apparatus 300 of the third embodiment can further include the sensing device to detect the light emission region, and the control unit sets the target area based on an output signal of the sensing device.

In this configuration, by using the sensing device having different capability compared to the object detection apparatus 300, the target area can be set with the enhanced precision.

The sensing device can be, for example, a camera, a millimeter-wave radar, an infrared sensor or the like. Compared to the LIDAR, the camera has a higher angular resolution, and thereby the camera can detect a smaller object effectively, but the camera cannot detect the distance to the object with the enhanced precision because the distance resolution is low for the camera. Therefore, after determining the target area with the enhanced precision by using the camera, the object detection process is performed by the LIDAR by increasing the signal-to-noise (SN) ratio for the target area, with which the object detection process having with the enhanced precision can be devised for the long distance object compared to the entire area observation mode.

The millimeter-wave radar has good weather-worthiness such as the millimeter-wave radar can detect an object with a good reliability when weather is rain or fogging. However, the millimeter-wave radar may be hard to set a wider angle for the detection region and to enhance the angular resolution concurrently at the same time. Therefore, when the object detection process is performed under a bad weather, the object detection process is preliminary performed by the millimeter-wave radar to determine the target area at first, and then the object detection process is further performed by the LIDAR while increasing the signal-to-noise (SN) ratio of the target area. With this configuration, the object detection process can be performed with the enhanced precision even if the object detection process is performed under the bad weather compared to the entire area observation mode.

The infrared sensor has a cost lower than the LIDAR while the detection distance is short, and the detection precision is not so high. Therefore, when the infrared sensor is used as the sensing device, the object detection system can be manufactured with less cost. Further, in addition to the detection result of the sensing device, the detection result of the previous frames acquired by the LIDAR can be also used to set the target area.

Further, the target area can be an area where an object exists less than a given distance from the object detection apparatus. For example, an area where an object exists less than 200 m from the LIDAR (i.e., object is in the range finding region of the LIDAR) can be used as the target area, which means an object outside t the range finding region of the LIDAR can be omitted from the detection target because the object outside the range finding region of LIDAR may not be required to be detected with a higher priority.

Further, by setting the long distance area where the received light intensity becomes weak due to the light attenuation as the target area, and increasing the detection precision for the long distance area, the detection precision of an object existing at the long distance area can be enhanced. In this case, the control unit can determine whether an object exists at the long distance area by using, for example, the position information included in the cluster information acquired by a stereo camera. Further, the target area can be set based on the range finding region of the LIDAR. For example, if the range finding region of the LIDAR is 200 m or greater, an area greater than 200 m from the LIDAR can be set as the target area.

Further, the target area is preferably an area where an object closest to the object detection apparatus exists among a plurality of objects existing in the light emission region.

For example, when an autonomously moveable apparatus such as robot is operated, or when a vehicle having the advanced driver assistance system (ADAS) is operated, the object closest to the moveable apparatus is required to be detected most urgently. Therefore, three dimensional information of the closest object is required to be acquired with the enhanced precision to perform the vehicle control for evading the collision or reducing effect of the collision. By setting the area where the object closest to the object detection apparatus exists as the target area, three dimensional information of the closest object can be acquired with the enhanced precision, and the collision evasion can be performed with the enhanced precision. The control unit can determine whether one object is the closest object by using, for example, the position on information included in the cluster information acquired by a stereo camera.

Further, the target area is preferably an area where a moving object exists because a current position of the moving object is less predictable compared to a current position of the still object, and the collision risk is higher for the moving object. The control unit can determine whether one object is the moving object by using, for example, the movement information included in the cluster information acquired by a stereo camera.

Further, the target area is preferably an area where a moving object having the fastest approaching speed relative to the object detection apparatus exists in the light emission region among a plurality of the moving objects because the collision risk of the moving object having the fastest approaching speed is higher. The control unit can determine whether an object is the moving object having the fastest approaching speed by using, for example, the movement information included in the cluster information acquired by a stereo camera.

Further, the target area is preferably an area where a low-reflective object exists because the detection missing risk is higher for the low-reflective object. The control unit can determine whether an object is the low-reflective object by using, for example, color information included in the cluster information acquired by a stereo camera.

Further, when the moveable apparatus is mounted with the object detection apparatuses 100, 200, 300 and 400 of the first to fourth embodiments, the moveable apparatus having higher safety measure for collision can be devised.

Further, the control unit can set a first threshold and a second threshold smaller than the first threshold. Specifically the control unit sets the first threshold to detect the output signal of the light detector when the light is emitted to the target area, and sets the second threshold to detect the output signal of the light detector when the light is emitted to the background area (target-not-specified area). In this configuration, the control unit is required to transmit information to identify one or more light emitting elements used for emitting the light to the target area, and information to identify one or more light emitting elements used for emitting the light to the background area (target-not-specified area) to the binarization processing unit. Specifically, a step of "increasing a threshold for the target area" can be added to the beginning of each of the SN ratio enhancement processes.

In this configuration, the signal level of signal light acquired for the target area can be set effectively greater than the signal level of signal light acquired for the background area (target-not-specified area), with which the signal-to-noise (SN) ratio for the target area can be enhanced.

Further, the setting method of the target area for the object detection apparatus is not limited to the above described methods. The target area is preferably set in view of the moving speed and surrounding area information of the moveable apparatus. Specifically, an area having a higher priority is set in view of the moving speed and surrounding area information of the moveable apparatus.

For example, if the moving speed of the moveable apparatus is faster such as when the vehicle is running with a high speed, the forward direction of the moveable apparatus is required to be monitored with a higher priority, and thereby the center area of the light emission region is set as the target area. Specifically, the light emission region is divided into three areas such as the upper area, the center area, and the lower area in the substantially vertical direction with respect to the surface where the moveable apparatus moves on, and the center area is set as the target area, and the light emission intensity of the LIDAR set for the center area is increased. With this configuration, the object can be detected with the enhanced precision in the center area, which is required to be monitored with a higher priority when the moving speed is fast.

For example, if the moving speed of the moveable apparatus is slow such as when the vehicle is running with a low speed, the left and the right directions of the moveable apparatus are required to be monitored with a higher priority to stop the moveable apparatus when a person suddenly comes into the lane, and thereby each of the left area and the right area of the light emission region is as the target area. Specifically, the light emission region is divided into three areas such as the left area, the center area, and the right area in the substantially parallel direction with respect to the surface where the moveable apparatus moves on, and each of the left area and the right area is set as the target areas, and the light emission intensity of the LIDAR set for the left area and the right area is increased. With this configuration, the object can be detected with the enhanced precision in the left area and the right area, required to be monitored with a higher priority when the moving speed is low.

For example, when the object detection apparatus includes the LIDAR and the camera, the target area can be set for the center area in the light emission region by using the captured image result of the camera, and the target area can be set for the left and the right directions of the light emission region by using the detection result of the LIDAR.

For example, when the object detection apparatus includes the LIDAR and the camera, the target area can be set for a long distance area in the light emission region by using the detection result of the LIDAR, and the target area can be set for a short distance area in the light emission region by using the captured image result of the camera.

For example, when the object detection apparatus includes the LIDAR and the stereo camera, it can be assumed that a moving object and a small object may exist at an area having lower disparity matching precision (e.g., area having less texture), and this area can be set as a target area. An area having greater texture can be assumed as a surface and a big building.

For example, when the object detection apparatus includes the LIDAR and a single camera or a stereo camera, an area that is determined having less texture can be set as the target area based on a luminance image acquired by the stereo camera.

As to the stereo camera, the area having less texture has lower disparity matching precision. Therefore, the LIDAR having the detection precision not related to the texture level so much can be used to monitor the area having less texture, with which the object can be detected with the enhanced precision.

For example, when the object detection apparatus includes the LIDAR and a stereo camera, an area that is determined having an edge can be set as the target area. Specifically, the differential edge detection is performed for a disparity image generated by the stereo camera, and an area that is determined having an edge (i.e., area continuously having similar disparity) is set as the target area. The object exiting area can be detected with the enhanced precision by detecting the edge with the enhanced precision.

For example, when the object detection apparatus including the LIDAR and a camera is mounted to a vehicle, the target area can be set for a bright area such as an area illuminated by a head light by using the captured image result of the camera, and the target area can be set for a dark area by using the detection result of the LIDAR because the LIDAR has higher detection precision for the dark area. The object can be detected with the enhanced precision by using the captured image result of the camera for the bright area. Further, after the bright area (i.e., area having a luminance value greater than a given value) and the dark area (i.e., area having a luminance value less than a given value) are detected by using the captured image result of the camera, the dark area can be set as the target area.

The camera can detect the low-reflective object in the bright area because the detection precision of the camera is higher than the detection precision of the LIDAR in the bright area, and thereby the low-reflective object in the bright area may not be required to be monitored by the LIDAR while the LIDAR can detect the low-reflective object in the dark area because the detection precision of the LIDAR is higher than the detection precision of the camera in the dark area, and thereby the low-reflective object in the dark area is required to be monitored by the LIDAR by detecting the dark area as the target area by using the LIDAR, in which the object can be detected with the enhanced precision compared to using the camera alone or the LIDAR alone.

Further, the object detection apparatuses 100, 200, 300 and 400 of the first to fourth embodiments are mounted to the vehicle, but not limited thereto. For example, any one of the object detection apparatuses 100, 200, 300 and 400 of the first to fourth embodiments can be mounted to an unmanned aerial vehicle (e.g., drone) that can be operated with a remote controller or can be operated autonomously. In this configuration too, by setting the target area, information of the specific object can be detected with the enhanced precision. When the object detection apparatus is mounted to the unmanned aerial vehicle, the object detection apparatus can be mounted under the unmanned aerial vehicle by aligning the gravity axis of the unmanned aerial vehicle and the gravity axis of the object detection apparatus to set a balance for the flying unmanned aerial vehicle, with which the unmanned aerial vehicle can fly with a stable manner.

Further, the object detection apparatuses 100, 200, 300 and 400 of the first to fourth embodiments can be mounted to a robot that can move autonomously. In this configuration too, by setting the target area, information of the specific object can be detected with the enhanced precision, and thereby the robot can move to the specific object with the enhanced precision.

The object detection apparatuses of the above described embodiments can be applied to the object information detection methods using the time of flight (TOF).

Further, the object detection apparatuses of the above described embodiments applied to the moveable apparatus can be also applied to still objects, and the object detection apparatuses of the above described embodiments alone can be devised as an apparatus.

Further, numerical values, shapes used for the object detection apparatuses of the above embodiments can be changed in light of the above teachings within the scope of the appended claims.

As to the above described embodiment of the present invention, information of an object (i.e., object information) can be detected with an enhanced precision.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An object detection apparatus comprising:
   a light emission unit including a light source to emit light to an object;
   a light receiving unit including a light detector to receive light reflected from the object;
   a signal processing unit including a signal detector to be input with an output signal of the light detector or a signal that is acquired by processing the output signal of the light detector; and
   a control circuit configured to
     control the light emission unit to emit light to all of a light emission region of the light emission unit, the light emission unit emitting the light at a first light emission intensity at a first emission cycle,
     control the light receiving unit to receive the emitted light at the first light emission intensity at the first emission cycle reflected from the object and control the signal processing unit to process the output signal of the light detector at a first frame rate,
     set at least one area in the light emission region of the light emission unit as a target area,
     set at least one of a light emission condition of the light emission unit or a processing condition of the signal processing unit such that the at least one of the light emission condition or the processing condition are different between a time when the light is emitted to the target area in the light emission region and a time when the light is emitted to a background area in the light emission region so as to enhance a signal-to-noise ratio of the output signal of the light detector by at least one of
       setting the light emission unit to emit the light at a second emission intensity that is higher than the first light emission intensity,
       setting the light emission unit to emit the light at a second emission cycle that is shorter than the first emission cycle, and
       setting the signal processing unit to process the output signal of the light detector at a second frame rate lower than the first frame rate, and
     calculate a distance of each of pixel areas of the object.

2. An object detection apparatus comprising:
   a light emission unit including a light source to emit light to an object;
   a light receiving unit including a light detector to receive light reflected from the object;
   a signal processing unit including a signal detector to be input with an output signal of the light detector or a signal that is acquired by processing the output signal of the light detector; and
   a control circuit configured to
     control the light emission unit to emit light to all of a light emission region of the light emission unit, the light emission unit emitting the light at a first light emission intensity at a first emission cycle,
     control the light receiving unit to receive the emitted light at the first light emission intensity at the first emission cycle reflected from the object and control the signal processing unit to process the output signal of the light detector at a first frame rate,
     set at least one area in the light emission region of the light emission unit as a target area,
     control at least one of the light emission unit or the signal processing unit such that the signal detector detects the output signal of the light detector or a signal that is acquired by processing the output signal of the light detector when the light is emitted to the target area so as to enhance a signal-to-noise ratio of the output signal of the light detector by at least one of
       setting the light emission unit to emit the light at a second emission intensity that is higher than the first light emission intensity,
       setting the light emission unit to emit the light at a second emission cycle that is shorter than the first emission cycle, and
       setting the signal processing unit to process the output signal of the light detector at a second frame rate lower than the first frame rate, and
     calculate a distance of each of pixel areas of the object.

3. The object detection apparatus of claim 1, wherein the control circuit controls the light emission unit to continuously emit the light to the target area for a plurality of times,
   wherein the signal processing unit further includes a signal processor to perform averaging and accumulating for a plurality of the output signals of the light detector obtained by continuously emitting the light to the target area for the plurality of times, and outputs the obtained signals to the signal detector.

4. The object detection apparatus of claim 1, wherein the signal detector is set with a threshold used for a signal detection operation, wherein the control circuit acquires a noise level from the output signal of the light detector when the light emission unit does not emit the light, and sets a level of the threshold greater than the noise level.

5. The object detection apparatus of claim 1, wherein when no object exists in the light emission region, the control circuit sets the light emission condition of the light emission unit and the processing condition of the signal processing unit used for the entire light emission region and the light emission condition of the light emission unit and the processing condition of the signal processing unit used for the target area as the same condition.

6. The object detection apparatus of claim 1, wherein the light source includes a plurality of light emitting elements disposed with an array pattern, and the control circuit controls the plurality of light emitting elements one by one.

7. The object detection apparatus of claim 1, wherein light detector includes a plurality of light receiving elements disposed with an array pattern.

8. The object detection apparatus of claim 1, wherein the light emission unit further includes a scanning device to scan the light emitted from the light source, and the control circuit controls at least one of the light source and the scanning device.

9. The object detection apparatus of claim 1, wherein the control circuit sets the target area based on the output signal of the signal processing unit that is generated when the light emission unit emits the light to the light emission region.

10. The object detection apparatus of claim 1, further comprising:
a sensing device to detect an area in the light emission region, and the control circuit sets the target area based on an output signal of the sensing device.

11. The object detection apparatus of claim 10, wherein the sensing device is a camera.

12. The object detection apparatus of claim 10, wherein the sensing device is a millimeter-wave radar.

13. The object detection apparatus of claim 1, wherein when a plurality of objects exists in the light emission region, an area where one object closest to the object detection apparatus exists is set as the target area.

14. The object detection apparatus of claim 1, wherein the target area is an area where one moving object exists.

15. The object detection apparatus of claim 1, wherein when a plurality of moving objects exist in the light emission region, an area where one moving object having the fastest approaching speed relative to the object detection apparatus exists is set as the target area.

16. The object detection apparatus of claim 1, wherein the target area is an area where a low-reflective object exists.

17. A moveable apparatus comprising:
the object detection apparatus of claim 1.

18. The object detection apparatus of claim 1, wherein the control circuit is configured to set the at least one area in the light emission region of the light emission unit as the target area when a distance between the object and the light emission unit is less than a predetermined distance.

19. The object detection apparatus of claim 1, wherein the control circuit is configured to generate a distance image of the object based the calculated distance of each of pixel areas of the object.

* * * * *